(12) United States Patent
Takebe et al.

(10) Patent No.: US 7,627,176 B2
(45) Date of Patent: Dec. 1, 2009

(54) APPARATUS, METHOD, AND COMPUTER PROGRAM FOR ANALYZING DOCUMENT LAYOUT

(75) Inventors: Hiroaki Takebe, Kawasaki (JP);
Katsuhito Fujimoto, Kawasaki (JP);
Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 422 days.

(21) Appl. No.: 11/175,127

(22) Filed: Jul. 5, 2005

(65) Prior Publication Data
US 2006/0204096 A1  Sep. 14, 2006

(30) Foreign Application Priority Data
Mar. 4, 2005 (JP) .............................. 2005-061529

(51) Int. Cl.
*G06K 9/34* (2006.01)
(52) U.S. Cl. ...................... 382/180; 382/176; 382/190
(58) Field of Classification Search ................. 382/190, 382/180
See application file for complete search history.

(56) References Cited

U.S. PATENT DOCUMENTS

| | | | | |
|---|---|---|---|---|
| 5,588,072 A | * | 12/1996 | Wang | 382/176 |
| 5,680,479 A | * | 10/1997 | Wang et al. | 382/176 |
| 5,774,579 A | * | 6/1998 | Wang et al. | 382/176 |
| 5,848,191 A | * | 12/1998 | Chen et al. | 382/229 |
| 5,999,647 A | * | 12/1999 | Nakao et al. | 382/187 |
| 6,446,035 B1 | * | 9/2002 | Grefenstette et al. | 704/1 |
| 6,993,205 B1 | * | 1/2006 | Lorie et al. | 382/290 |
| 2002/0154817 A1 | * | 10/2002 | Katsuyama et al. | 382/190 |

FOREIGN PATENT DOCUMENTS

| | | |
|---|---|---|
| JP | 2-263272 | 10/1990 |
| JP | 8-284797 | 10/1996 |
| JP | 10-187890 | 7/1998 |
| JP | 11-219407 | 8/1999 |

(Continued)

OTHER PUBLICATIONS

Multimedia Telecommunications and Applications Third International Cost 237 Workshop Barcelona, Spain, Nov. 1996 Proceedings p. 112.*

(Continued)

*Primary Examiner*—Bhavesh M Mehta
*Assistant Examiner*—Michael Vanchy, Jr.
(74) *Attorney, Agent, or Firm*—Fujitsu Patent Center

(57) ABSTRACT

A document layout analysis program capable of extracting an appropriate set of text blocks from a given document image even in the case where the document layout is so complicated that conventional extraction methods with a single extraction condition would not work well. A plurality of different extraction conditions are stored in an extraction condition memory for use in extracting text blocks from a given document image. In accordance with those extraction conditions, a text block extractor extracts a plurality of sets of text blocks from the document image. A text block consolidator produces a consolidated set of text blocks by performing character recognition on each extracted text block, evaluating validity of each text block based on a result of the character recognition, and selecting most valid text blocks from among the plurality of sets of text blocks.

17 Claims, 28 Drawing Sheets

FOREIGN PATENT DOCUMENTS

| | | |
|---|---|---|
| JP | 2000-105836 A | 11/2000 |
| JP | 2002-092549 A | 3/2002 |
| JP | 2002-108847 | 4/2002 |
| JP | 2004-059954 | 2/2004 |
| JP | 2005-250816 | 9/2005 |

OTHER PUBLICATIONS

"Japanese Office Action," Partial English-language translation, mailed by JP Patent Office Jun. 23, 2009 in reference to corresponding JP App. No.: 2005-061529.

* cited by examiner

TEXT BLOCK EXTRACTION RESULT $R_0$
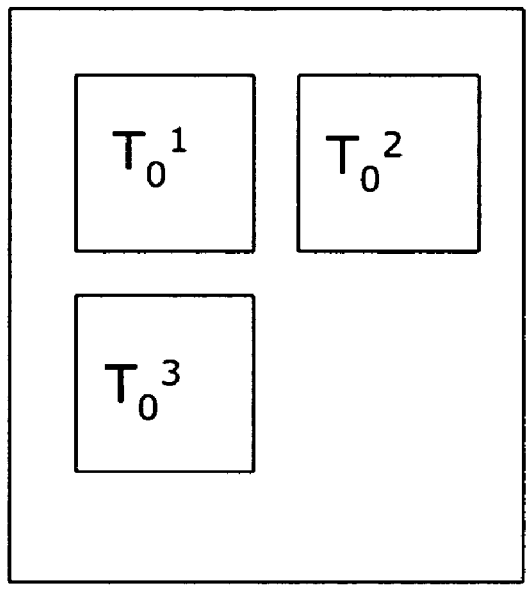
TEXT BLOCK EXTRACTION RESULT $R_1$
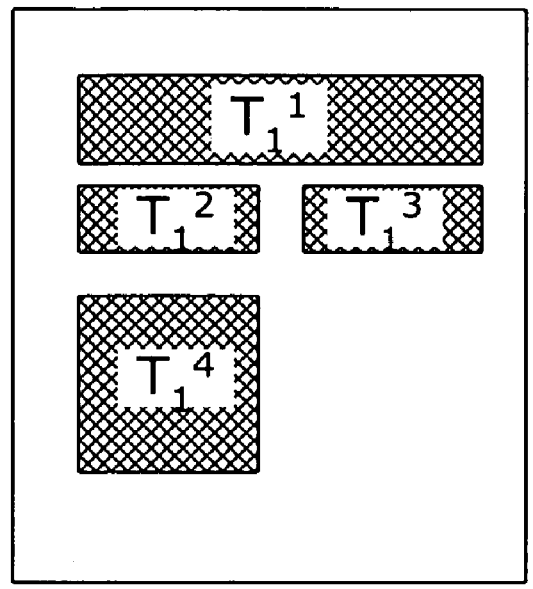
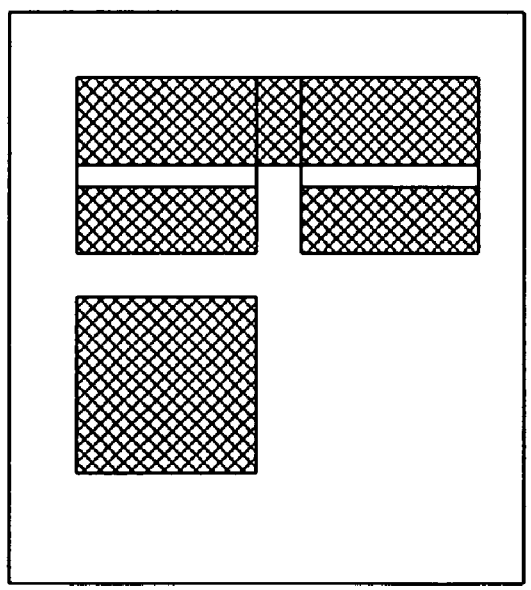
FIG. 13

TEXT BLOCK CONSOLIDATION

APPARATUS, METHOD, AND COMPUTER PROGRAM FOR ANALYZING DOCUMENT LAYOUT

CROSS-REFERENCE TO RELATED APPLICATIONS

This application is based upon and claims the benefits of priority from the prior Japanese Patent Application No. 2005-061529, filed on Mar. 4, 2005, the entire contents of which are incorporated herein by reference.

BACKGROUND OF THE INVENTION

1. Field of the Invention

The present invention relates to an apparatus, method, and computer program for analyzing layout of a document to extract blocks of document text. More particularly, the present invention relates to a document layout analyzing apparatus, method, and computer program that extract text blocks from a given document image on the basis of accuracy of text in each block.

2. Description of the Related Art

Optical character readers (OCR) are widely used today to identify characters on a document through the use of optical sensing devices such as image scanners. Their output, or recognized text data, is provided in the form of character codes. The functions of OCR can be implemented as computer software programs.

A text recognition process using an OCR device begins with capturing of an optical image of a given document containing printed characters, handwritten characters, and other objects. The OCR device locates each block of text from the scanned document image, extracts character components in the extracted text blocks, and recognizes those characters by using pattern matching or other algorithms. The text block extraction process involves tasks of analyzing the physical layout of various objects constituting a document, which include, for example, discrete characters, lines (rows of characters), text blocks, figures, tables, and cells.

Several methods have been proposed to implement the function of extracting text blocks from a given document image. For example, Japanese Patent Application Publication No. 11-219407 (1999) discloses a technique based on proximity and homogeneity of objects. Specifically, when a set of primitive elements is given, the method first identifies lines by combining such elements that are located in relatively close proximity and have similar sizes. The method then combines the lines in the same way (i.e., based on the proximity and physical homogeneity of lines), thereby identifying paragraphs, or text blocks.

Another example is Japanese Patent Application Publication No. 2-263272 (1990). According to this publication, the proposed method searches a document image to find blank areas satisfying a predetermined condition about their sizes. Text blocks can then be identified by extracting image areas other than the areas covered by those blank areas.

Many real-world documents, however, have their own unique object layouts, which are often complicated as well. The existing methods described above sometimes fail to extract correct text blocks. For example, the first-mentioned method (No. 11-219407) may overly combine character components found in a document when its text blocks are laid out in a convoluted arrangement, or when text blocks and figures are mixed in a complicated way. In such cases, two or more text lines could be recognized mistakenly as a single line. For another example, the second-mentioned method (No. 2-263272) may encounter considerable difficulties in extracting text blocks when what separate them from other objects in a document are not simple rectangles.

To solve the above problems, we, the applicants, have proposed a new document layout analysis program that can extract text blocks from a document having a complicated layout, which is filed as Japanese Patent Application No. 2004-059954. The proposed program treats blank areas in a document image as virtual separators dividing text blocks, the size of blank areas being specified as a process parameter. Each resulting text block is subjected to a validity test, and text block extraction is executed recursively while modifying the parameter value until a collection of text blocks satisfying predetermined validity requirements is obtained. This approach enables analysis of a complex document layout to extract correct text blocks.

There are, however, some documents that the above-described analysis program (No. 2004-059954) is unable to extract appropriate text blocks. We suspect that the performance limitation of this program comes from the fact that the initial value of the parameter used to find blank separators is fixed. Although the parameter changes in the course of analysis, the final result of extraction still depends on the fixed initial value of that parameter, and it is unlikely that a single fixed parameter would fit every given document. This is why the proposed analysis program sometimes produces incorrect text blocks.

Let us discuss the issue in greater depth. The proposed analysis program (No. 2004-059954) may happen to ignore a blank separator at the first cycle of its separator identification process, due to an inclination of a scanned document image or noises present on that image. Missing a separator could result in an overly consolidated text block. While the program may find a separator there in the second or subsequent cycle, the identified separator in such situations would not always be appropriate, thus leading to an overly consolidated text block after all.

When the document includes some large characters as in a subject line, the analysis program (No. 2004-059954), in the first cycle of its separator extraction process, could misinterpret a blank space within a large character image as a valid separator. If this happens, the line containing that character will be recognized as two separate lines. The analysis program, however, does not have a function of recombining such divided lines.

SUMMARY OF THE INVENTION

In view of the foregoing, it is an object of the present invention to provide a document layout analyzing apparatus, method, and computer-readable medium storing a program that can extract an appropriate set of text blocks from a given document image even in the case where the document layout is so complicated that conventional extraction methods with a single extraction condition would not work well.

To accomplish the above object, the present invention provides a computer-readable medium storing a program for analyzing layout of text on a document image to extract text blocks for character recognition purposes. This program causes a computer to function as an extraction condition memory, a text block extractor, and a text block consolidator. The extraction condition memory stores a plurality of extraction conditions for use in extracting text blocks from a given document image. In accordance with those extraction conditions, the text block extractor extracts a plurality of sets of text blocks from the given document image. The text block consolidator produces a consolidated set of text blocks by performing character recognition on each extracted text block, evaluating validity of each text block based on a result of the character recognition, and selecting most valid text blocks from among the plurality of sets of text blocks.

To accomplish the above object, the present invention also provides a document layout analyzing apparatus for analyzing layout of text on a document image to extract text blocks for character recognition purposes. This apparatus has an extraction condition memory, a text block extractor, and a text block consolidator. The extraction condition memory stores a plurality of extraction conditions for use in extracting text blocks from a given document image. In accordance with those extraction conditions, the text block extractor extracts a plurality of sets of text blocks from the given document image. The text block consolidator produces a consolidated set of text blocks by performing character recognition on each extracted text block, evaluating validity of each text block based on a result of the character recognition, and selecting most valid text blocks from among the plurality of sets of text blocks.

Further, to accomplish the above object, the present invention provides a document layout analyzing method for analyzing layout of text on a document image to extract text blocks for character recognition purposes. This method includes the steps of: (a) storing a plurality of extraction conditions; (b) extracting a plurality of sets of text blocks from the document image in accordance with the plurality of extraction conditions stored; (c) performing character recognition on each extracted text block; (d) evaluating validity of each text block based on a result of the character recognition; and (e) producing a consolidated set of text blocks by selecting most valid text blocks from among the plurality of sets of text blocks.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 13 shows an example of text block consolidation.

DESCRIPTION OF THE PREFERRED EMBODIMENTS

Figure 1:
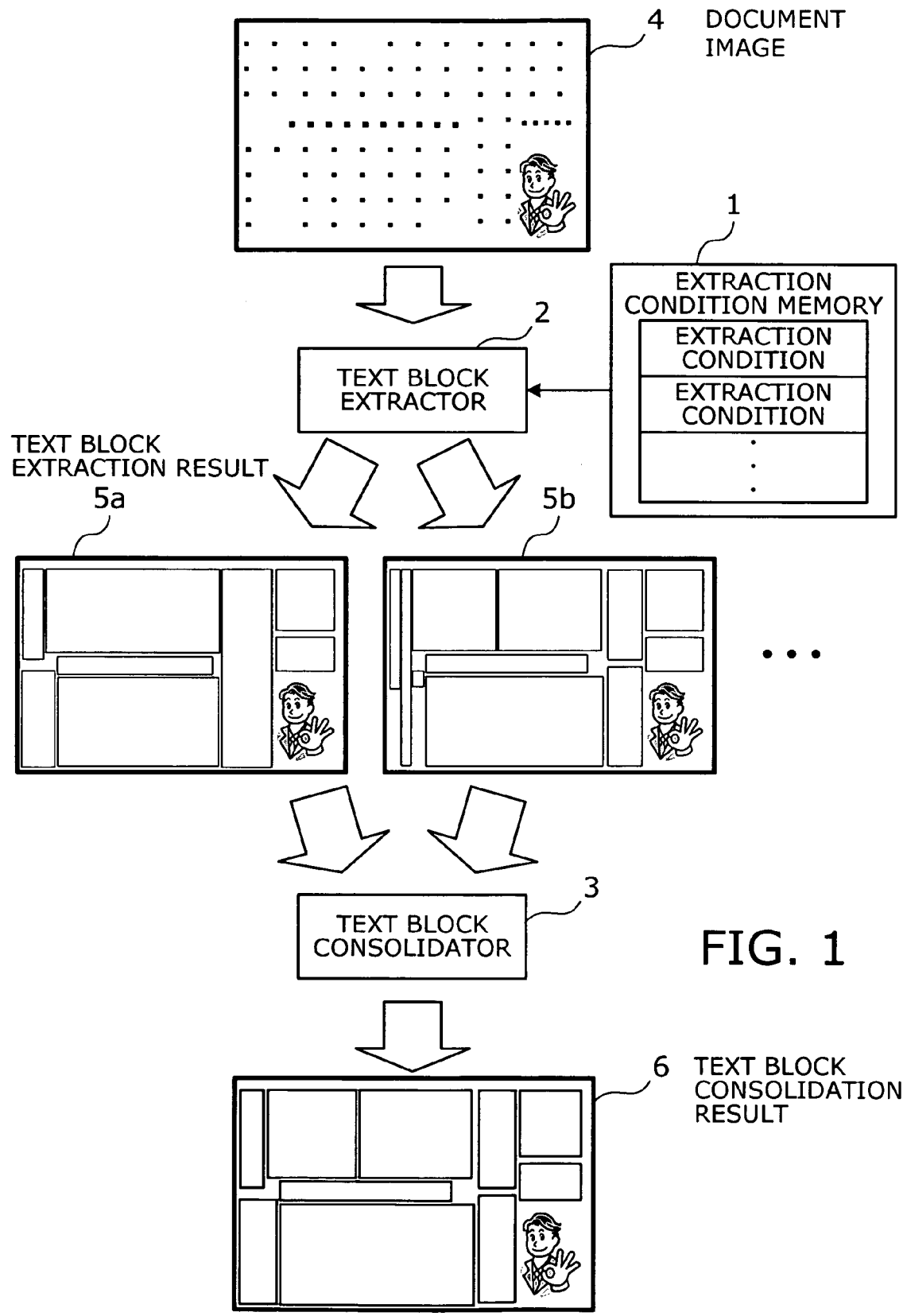
FIG. 1 provides an overview of an embodiment of the present invention.

Preferred embodiments of the present invention will be described below with reference to the accompanying drawings, wherein like reference numerals refer to like elements throughout.

FIG. 1 gives an overview of an embodiment of the present invention. This embodiment provides a document layout analyzing apparatus having an extraction condition memory 1, a text block extractor 2, and a text block consolidator 3. The extraction condition memory 1 stores a plurality of extraction conditions that define the conditions for extracting text blocks from a given document image 4. Extraction conditions include, for example, the size of blank areas that each separator is supposed to contain. Here, the term "separator" refers to an image area that separates one text block from another.

The text block extractor 2 extracts a set of text blocks from the document image 4 according to each of the text block extraction conditions stored in the extraction condition memory 1. In the case, for example, where the extraction conditions specify various blank area sizes for separators, the text block extractor 2 scans the document image 4 to find blank areas satisfying one of the specified extraction conditions and identifies such areas as separators. The text block extractor 2 extracts the remaining areas divided by the separators, which are referred to as the text blocks. Depending on which extraction condition is used, the process yields different text block extraction results 5a, 5b, and so on.

The text block consolidator 3 attempts character recognition on the extracted text blocks in each of the text block extraction results 5a, 5b, and so on. The recognition results indicate whether each text block definition is valid or not. Based on this validity test, the text block consolidator 3 then selects most valid text blocks, thus producing a consolidated set of text blocks, which is referred to as a text block consolidation result 6 in FIG. 1.

The above document layout analyzing apparatus operates as follows. When a document image 4 is given, the text block extractor 2 extracts text blocks from that document image 4 according to each different text block extraction condition stored in the extraction condition memory 1. The text block extractor 2 therefore outputs multiple sets of text block extraction results 5a, 5b, and so on. The text block consolidator 3 performs character recognition on each text block extracted by the text block extractor 2, thereby evaluating how accurate the extracted text blocks are. Ill-defined text blocks would produce a poor recognition result and should thus be rejected as being invalid. The text block consolidator 3 selects valid text blocks out of the plurality of text block extraction results 5a, 5b, and so on and outputs them as a text block consolidation result 6.

The proposed process makes it possible to extract optimal text blocks, which is hardly achieved by conventional algorithms with a single extraction condition. The next section will describe the details of this embodiment.

FIRST EMBODIMENT

According to a first embodiment, multiple sets of parameters are defined to specify a minimum required size of blank areas so that they serve as separators (i.e., boundaries between text blocks). Each parameter set gives initial values for the recursive text block extraction process described in, for example, Japanese Patent Application No. 2004-059954. This extraction process yields multiple sets of extracted text blocks, which are used to compile a consolidation source set of text blocks with an improved accuracy.

The process of combining multiple extraction results involves a task of choosing minimal combinations from among all possible combinations. According to the present embodiment, this task is accomplished by taking advantage of the concept of cliques in graph theory. That is, each extracted text block is represented as a node of a graph, where only coexistent text blocks can be interconnected by paths. From that graph, a set of cliques (i.e., combinations of interconnected nodes, or subgraphs) are extracted on the basis of some predetermined cost functions.

More specifically, each combination of text blocks will be evaluated in terms of cognitive cost and linguistic cost. The term "cognitive cost" refers to a value associated with the accuracy of character recognition. The higher the accuracy rate, the lower the cognitive cost. The term "linguistic cost" refers to a factor that represents how linguistically natural the recognized sentence sounds. The more natural the text, the lower the linguistic cost. The extracted candidate combinations are ranked in the order of the sum of points that the text blocks earn in accordance with their cognitive costs and linguistic costs. The highest-point combination is then identified as a final solution (referred to as a "text block integration result").

Figure 2:
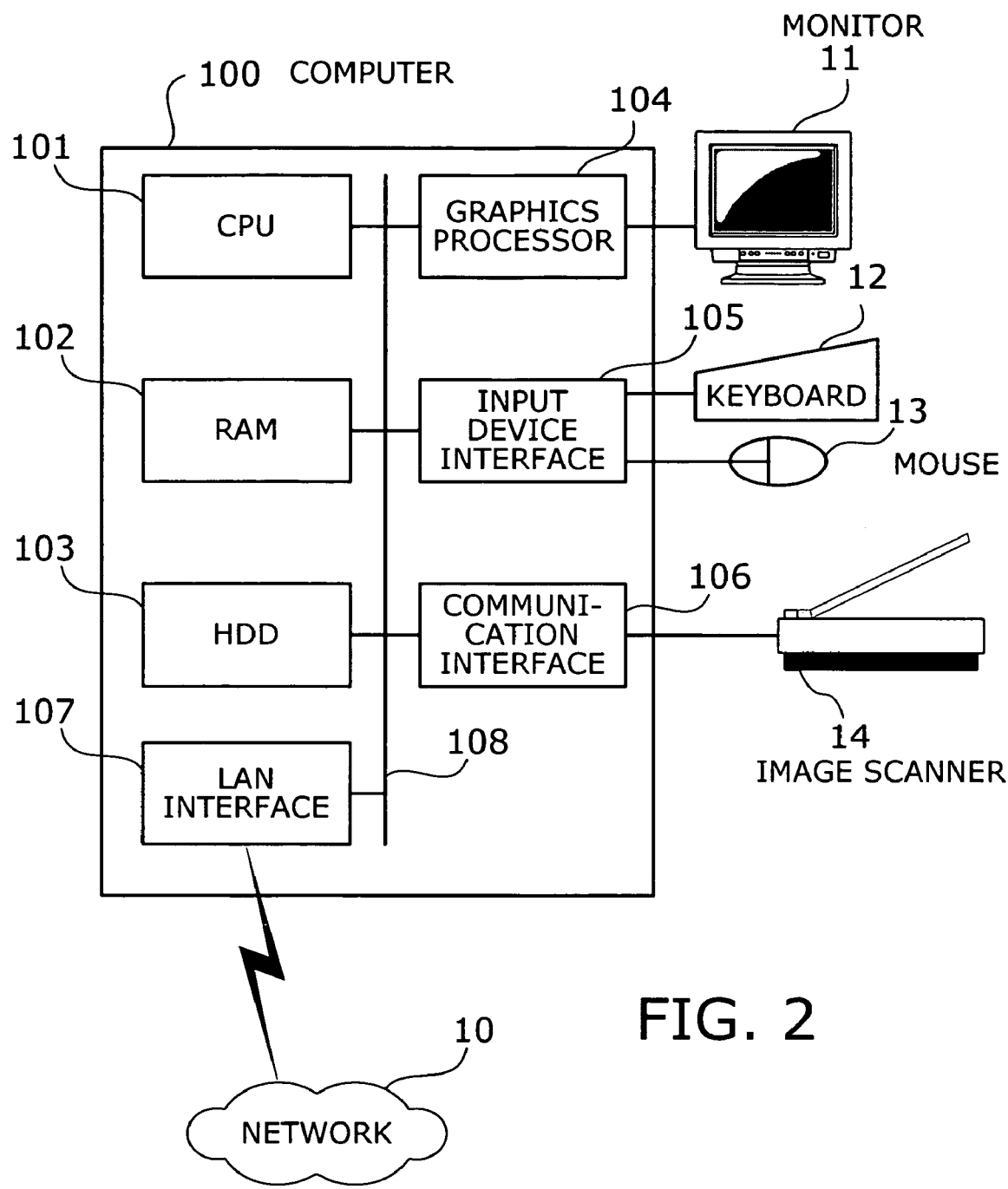
FIG. 2 shows an example hardware configuration of a computer platform suitable for the present embodiment of the invention.

The present embodiment, as well as another embodiment described in a later section, uses a computer system as its hardware platform for implementing the proposed algorithm of document layout analysis. FIG. 2 shows an example hardware configuration of a computer platform suitable for the present embodiment. The illustrated computer system has the following functional elements: a central processing unit (CPU) 101, a random access memory (RAM) 102, a hard disk drive (HDD) 103, a graphics processor 104, an input device interface 105, a communication interface 106, and a LAN interface 107.

The CPU 101 controls the entire system, interacting with other elements via a bus 108. The RAM 102 serves as temporary storage for the whole or part of operating system (OS) programs and application programs that the CPU 101 executes, in addition to other various data objects manipulated at runtime. The HDD 103 stores program and data files of the operating system and various applications, besides providing a storage space for document images to be processed.

The graphics processor 104 produces video images in accordance with drawing commands from the CPU 101 and displays them on the screen of an external monitor 11 coupled thereto. The input device interface 105 is used to receive signals from external input devices, such as a keyboard 12 and a mouse 13. Those input signals are supplied to the CPU 101 via the bus 108.

The CPU 101 uses the communication interface 106 to communicate with a peripheral data input/output device. In the present example, an image scanner 14 is connected to the communication interface 106. Scanned document image data is transferred from the image scanner 14 to the CPU 101 via the communication interface 106. The LAN interface 107, on the other hand, is connected to a network 10, allowing the CPU 101 to exchange data with other computers (not shown) on the network 10.

The computer 100 and peripheral devices described above serve as a hardware platform for realizing the processing functions of the present embodiment. The following example assumes that the computer 100 analyzes the layout of a document for the purpose of recognizing printed characters from its image obtained by using the image scanner 14.

Figure 3:
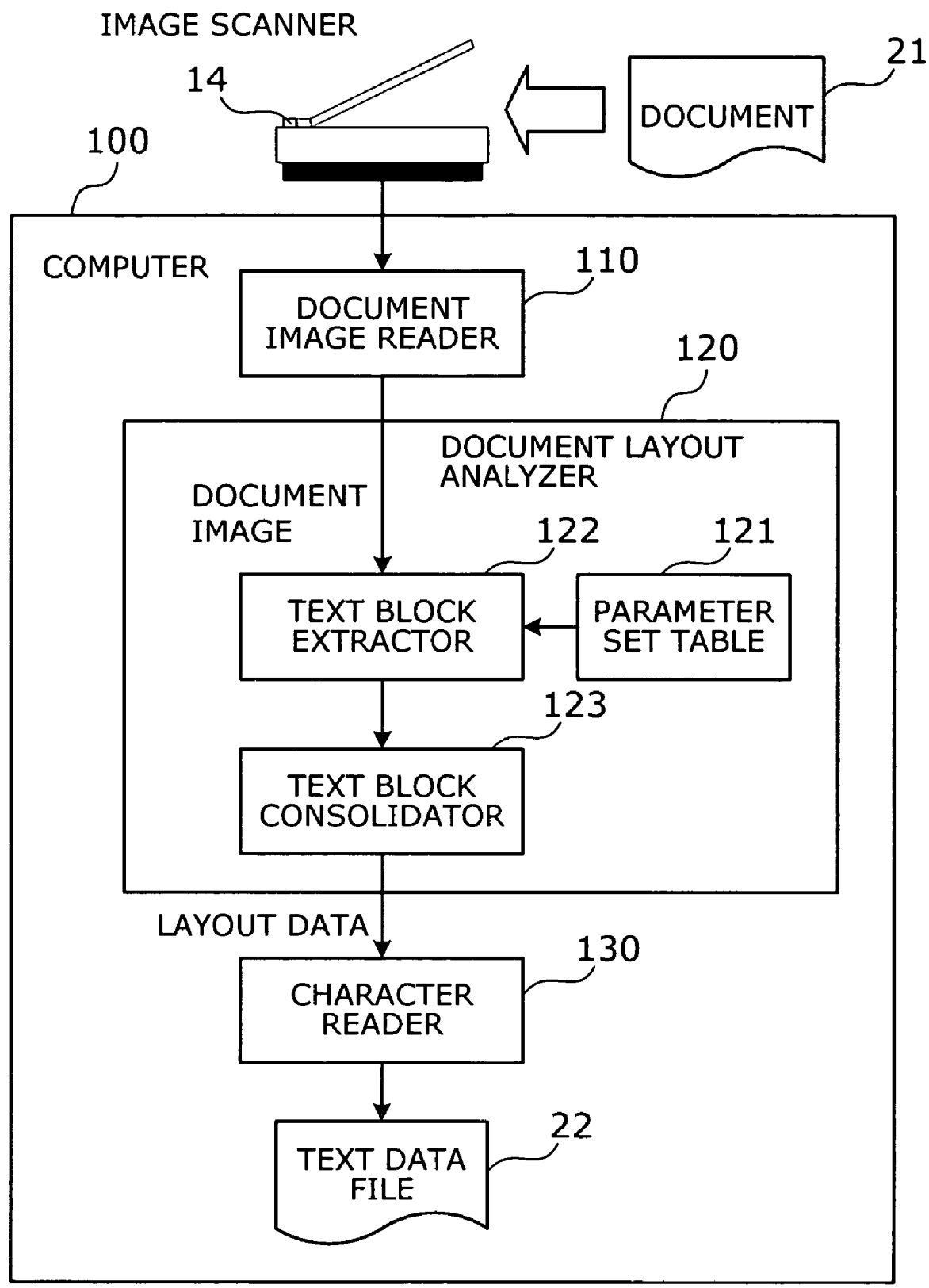
FIG. 3 is a block diagram showing document layout analysis functions according to the present embodiment.

FIG. 3 is a block diagram showing document layout analysis functions according to the present embodiment. The computer 100 has a document image reader 110, a document layout analyzer 120, and a character reader 130. The document image reader 110 controls an image scanner 14 to obtain a scanned image of a document 21. The resulting document image is transferred from the image scanner 14 to the document layout analyzer 120. Or alternatively, the document image reader 110 may supplies the document layout analyzer 120 with a document image that is previously scanned and stored in the HDD 103.

The document layout analyzer 120 analyzes the given document image to identify the layout of objects thereon and determine an optimal combination of text blocks. This document layout analysis result is passed to the character reader 130 as layout data. The character reader 130 recognizes characters in each text block listed in the image layout analysis result. The character reader 130 outputs the recognition result as a text data file 22 after converting it into a series of character codes.

Inside the document layout analyzer 120, there are a parameter set table 121, a text block extractor 122, and a text block consolidator 123. The parameter set table 121 is a data table that contains multiple sets of parameters each specifying a different initial condition for use in extracting text blocks separated by blank areas. Those parameter sets are previously given by the user. The details of this parameter set table 121 will be discussed later.

The text block extractor 122 extracts text blocks according to each parameter set stored in the parameter set table 121, thereby yielding a plurality of extraction results corresponding to different parameter sets. Those text block extraction results are then passed to the text block consolidator 123. The text block consolidator 123 consolidates them into a single consolidated set of text blocks, which is what has been mentioned above as a document layout analysis result.

Figure 4:
FIG. 4 shows an example data structure of a parameter set table.

FIG. 4 shows an example data structure of a parameter set table. The illustrated parameter set table 121 contains a plurality of pairs of control parameters "n" and "x" for identifying separators. Let p_num represent the number of parameter sets and P(i) each individual parameter set, where i (i=0, 1, 2, . . . p_num−1) is an index number used to specify a particular parameter set. Also let $R_i$ represent the i-th text block extraction result corresponding to a parameter set P(i).

Figure 5:
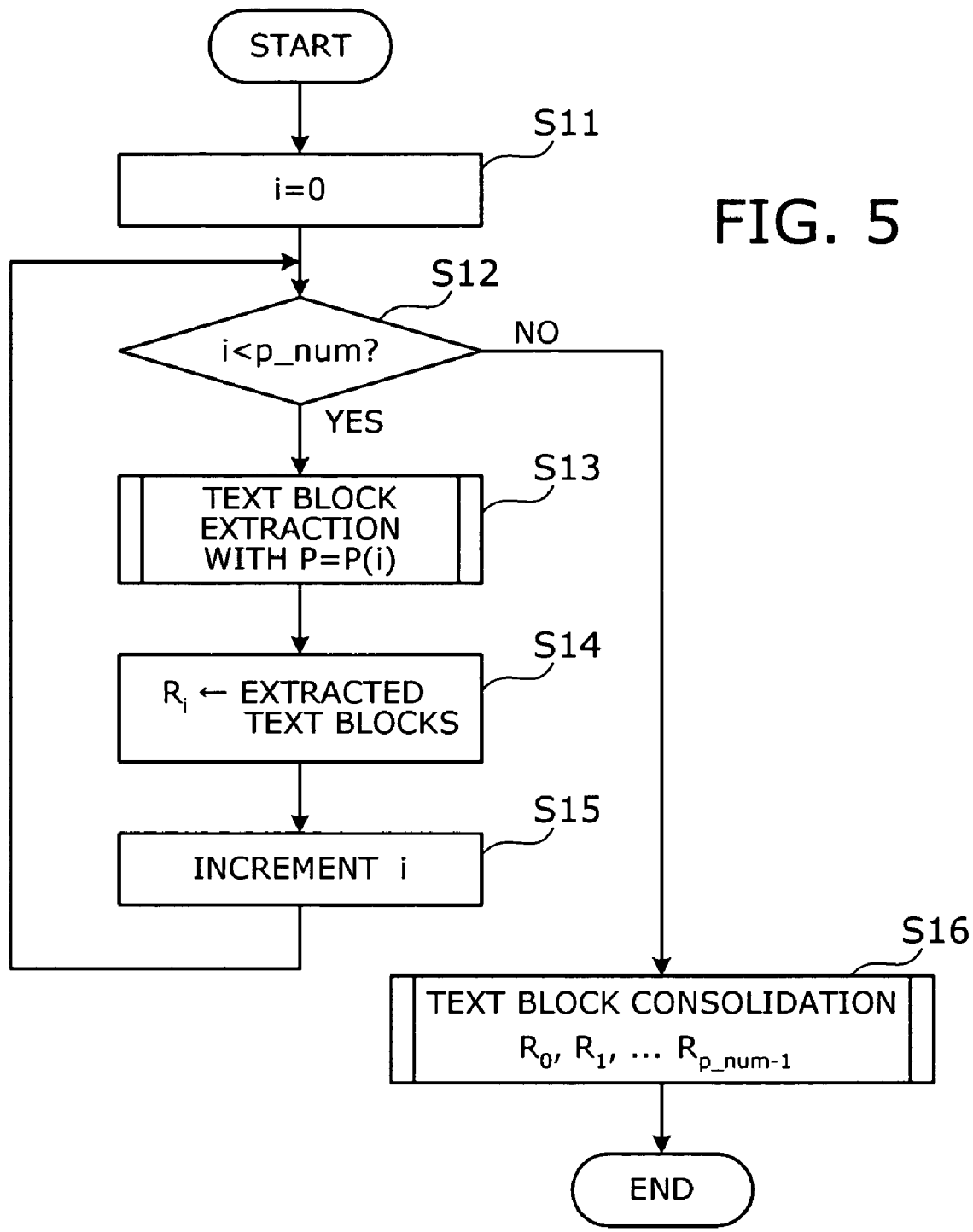
FIG. 5 is a flowchart showing a process of document layout analysis.

Referring now to the flowchart of FIG. 5, the following will show how the document layout analyzer 120 works. The process of FIG. 5 takes a batch processing method that compiles a consolidated result from all extracted text blocks $R_0$, $R_1, \ldots R_{p\_num-1}$ at once. More specifically, this process includes the following steps:

(Step S11) The text block extractor 122 initializes the parameter set index number i to zero.

(Step S12) The text block extractor 122 determines whether i is smaller than p_num. If so, the process advances to step S13. If not, the process branches to step S16.

(Step S13) With P=P(i) (i.e., selecting P(i) as the current parameter set P), the text block extractor 122 extracts text blocks from the given document image. Details of this step will be described later.

(Step S14) The text block extractor 122 saves the text block extraction result of step S13 (i.e., a set of extracted text blocks) as $R_i$.

(Step S15) The text block extractor 122 increments i by one before making the process go back to step S12.

The loop of S12-S15 repetitively executes text block extraction using every parameter set one by one while increasing the index i until it reaches p_num.

(Step S16) When the extraction is finished with all parameter sets, the text block consolidator 123 selectively consolidates multiple sets of extracted text blocks $R_0$, $R_1, \ldots R_{p\_num-1}$, thus outputting a document layout analysis result.

Figure 6:
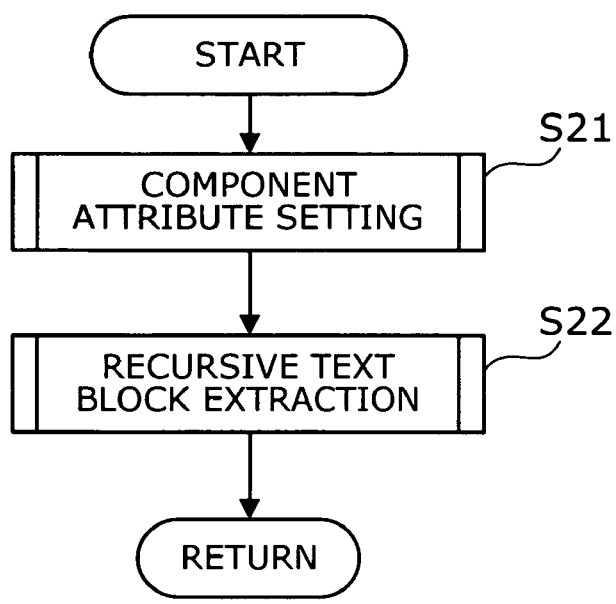
FIG. 6 is a flowchart showing a process of text block extraction.

Referring next to another flowchart shown in FIG. 6, the text block extraction process at step S13 will be described in detail. As seen from FIG. 6, this process is composed of the following two steps:

(Step S21) The text block extractor 122 first call a component attribute setting process. More specifically, it gives a particular attribute to each image component that appears as a collection of black pixels on the given document image. Attributes include: character element, separator, figure, frame, and noise. Figure attribute is assigned to components that are not character elements, separators, frames, or noises and contain no character elements in themselves. Frames are graphic objects that surround a plurality of character elements.

(Step S22) The text block extractor 122 then calls a recursive text block extraction process. Specifically, the text block extractor 122 applies a series of processing operations on a set of components with attributes added at step S21. The operations include (a) extracting virtual separators, (b) identifying text blocks, and (c) testing whether each text block satisfies predetermined requirements. If an extracted text block is found inappropriate for character recognition, the text block extractor 122 varies control parameters for the size criteria of blank areas before it retries to find virtual separators in that same image region to identify a new text block. These operations are repeated in a recursive fashion.

Component Attribute Setting

Figure 7:
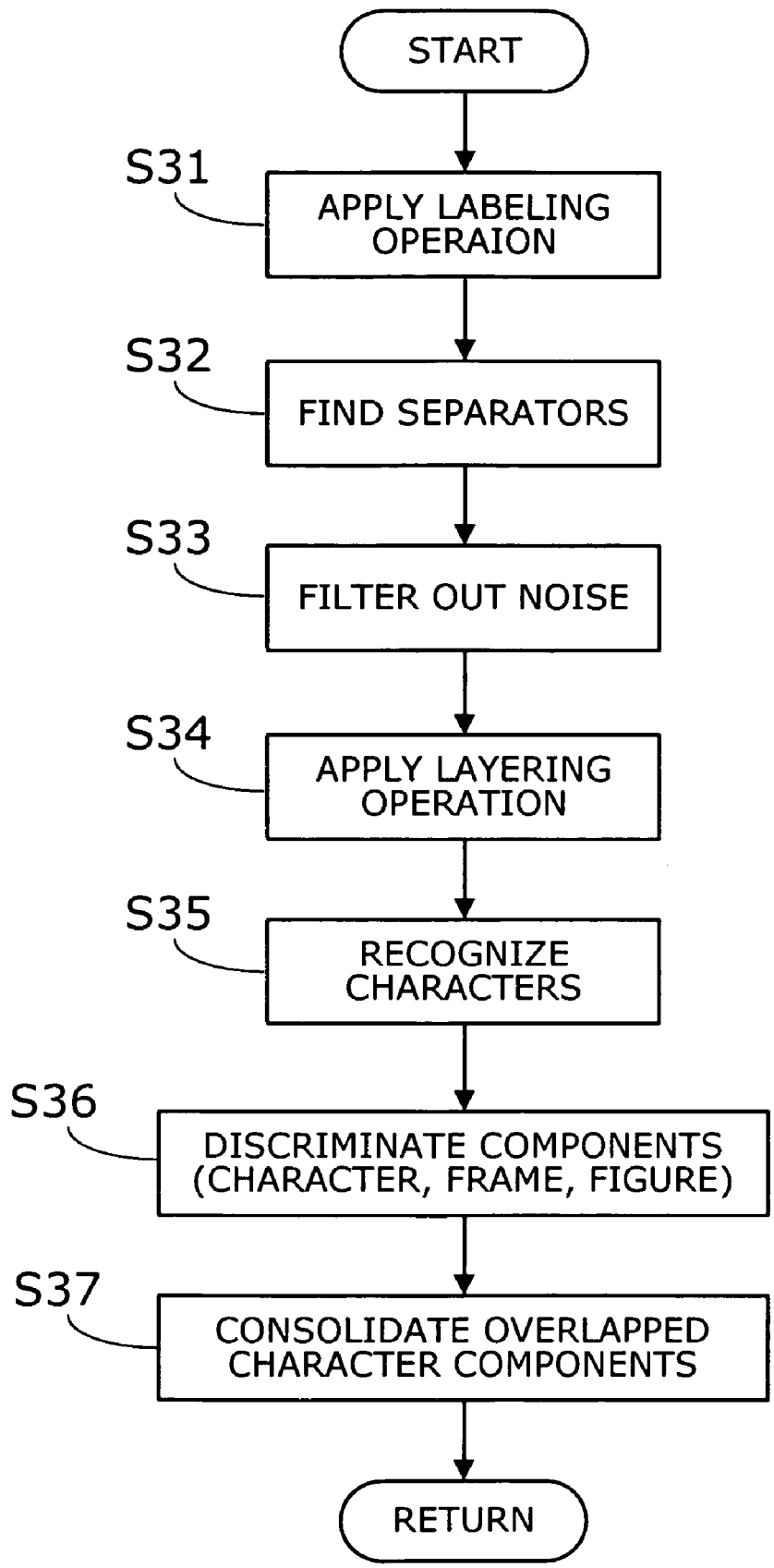
FIG. 7 is a flowchart showing a process of setting component attributes.

Referring to the flowchart of FIG. 7, we will now provide details of the component attribute setting process of step S21. This process includes the following steps:

(Step S31) A document image is captured with the image scanner 14 and supplied to the text block extractor 122 under the control of the CPU 101. The text block extractor 122 then applies a labeling operation to the given document image. The labeling process identifies every image component appearing as a chunk of black pixels and records the coordinates of that component.

Figure 8:
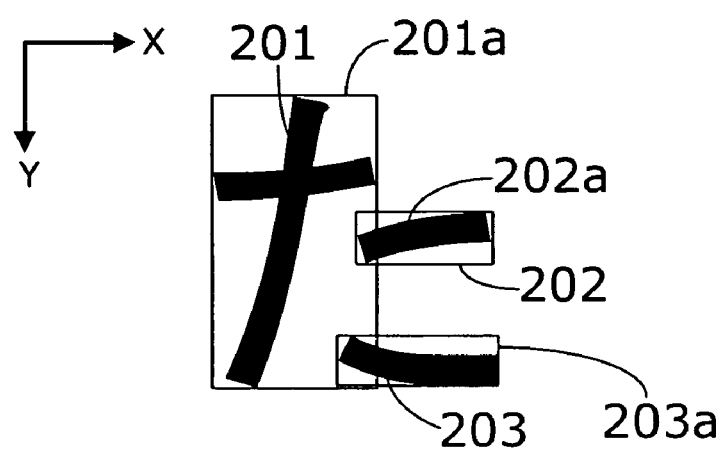
FIG. 8 shows a specific example of a labeling operation.

FIG. 8 shows a specific example of a labeling operation. Specifically, this example shows a Japanese hiragana character composed of three components 201, 202, and 203, each of which is a collection of black pixels. The text block extractor 122 circumscribes a tightest rectangle around each component 201, 202, and 203. It then records the coordinates of those circumscribed rectangles 201a, 202a, and 203a. For example, the X-Y coordinates of upper-left and lower-right corners of each rectangle are recorded as position data. Such processing operations are applied to all components across the given document image.

(Step S32) The text block extractor 122 subjects the component set S obtained at step S31 to a separator discrimination process. Separators are components that set a text block apart from others. For example, a ruled line drawn between sentences falls into the category of separators. According to the present embodiment, a component will be determined to be a separator if the long-side length of its circumscribed rectangle is greater than or equal to a predetermined value and also the aspect ratio is greater than or equal to a predetermined value.

(Step S33) The text block extractor 122 subjects the component set S to a noise filtering process. According to the present embodiment, a component will be regarded as a noise if the area of its circumscribed rectangle is not greater than a predetermined value.

(Step S34) The text block extractor 122 compiles a new set Sa of components by removing the separators and noises found at steps S32 and S33 from the original component set S. This set Sa is then subjected to a layering operation to define parent-child relationships between interrelated components.

Figure 9:
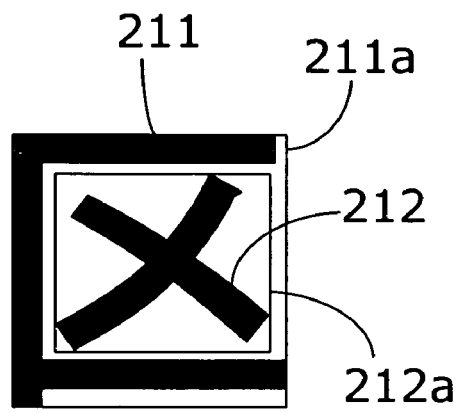
FIG. 9 shows a specific example of a layering operation.

FIG. 9 shows a specific example of a layering operation, in which a Chinese character composed of two components 211 and 212 are shown. The labeling operation at step S31 has registered the coordinates of circumscribed rectangles 211a and 212a of those components 211 and 212. The example character of FIG. 9 is peculiar in that one component 212 is contained in another component 211. The layering operation finds a parent-child relationship in this kind of components. That is, the second component 212 is registered as a child of the first component 211, and the first component 211 is registered as the parent of the second component 212.

(Step S35) The text block extractor 122 subjects the layered component set Sa to a character recognition process. Specifically, the text block extractor 122 first recognizes one character from each circumscribed rectangle. If the recognition succeeds with high confidence (i.e., the recognition result is likely to be correct), the text block extractor 122 marks that component with a character component flag "CH."

The text block extractor 122 then examines whether any parent-child relationships are attached to the component. In the case where the component has one or more child components as in FIG. 9, the text block extractor 122 consolidates those overlapped child components with their parent component. That is, it defines a new circumscribed rectangular area that covers all those parent and child components. The text block extractor 122 then recognizes a character in this newly defined rectangle area.

Figure 10:
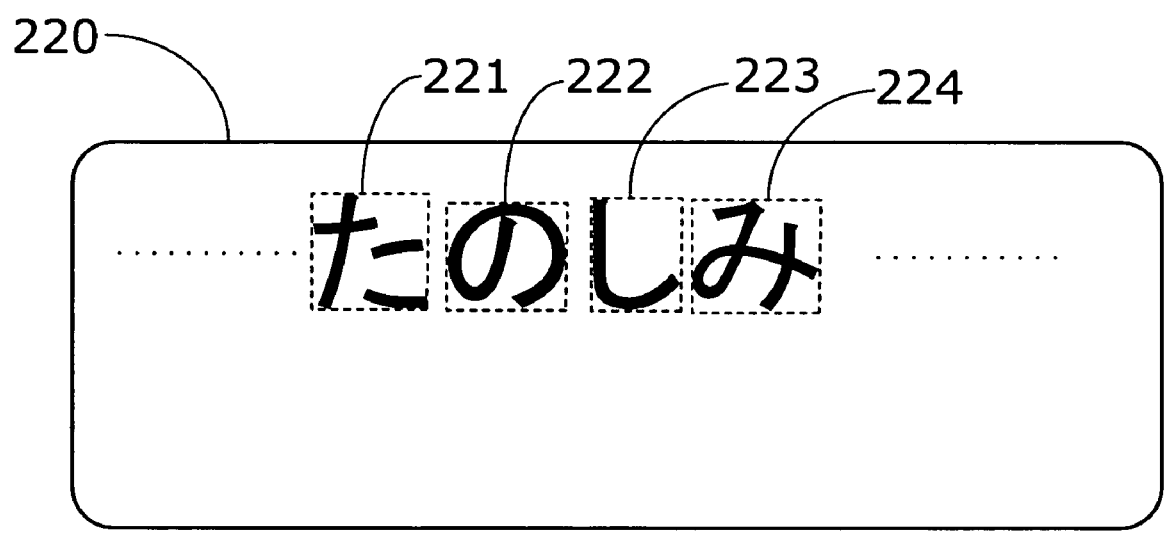
FIG. 10 shows a frame containing character components.

FIG. 10 shows a frame containing character components. As a result of consolidation of overlapped components, the text block extractor 122 identifies character components in circumscribed rectangular areas 221, 222, 223, and 224. Since the outermost component 220 contains all those character components, the text block extractor 122 registers the rectangular areas 221, 222, 223, and 224 as children of the component 220. As in this example, a component is considered to be a frame when it contains at least a predetermined number of child components that are recognized as characters with high confidence. The component 220 is therefore marked with a frame flag "FR" indicating that it is likely to be a frame containing a plurality of characters.

(Step S36) The text block extractor 122 subjects the set Sa to a component discrimination process. Specifically, if a component bearing a character component flag "CH" has a parent component without a flag "CH," the text block extractor 122 will add a frame flag "FR" to that parent component. Also, for a pair of character components (i.e., those marked with "CH") having a parent-child relationship, the text block extractor 122 compares their confidence levels with each other, and if the child component is more confident than the parent, it removes the character component flag "CH" from the parent component and gives it a frame flag "FR" instead.

Of all components in the set Sa, the text block extractor 122 recognizes those with "FR" as frames. Some components with neither "CH" flag nor "FR" flag are identified as figures if their respective circumscribed rectangles are not smaller than a predetermined size. The text block extractor 122 then regards the remaining components as character components.

(Step S37) Lastly, the text block extractor 122 consolidates overlapped character components.

Recursive Text Block Extraction

Figure 11:
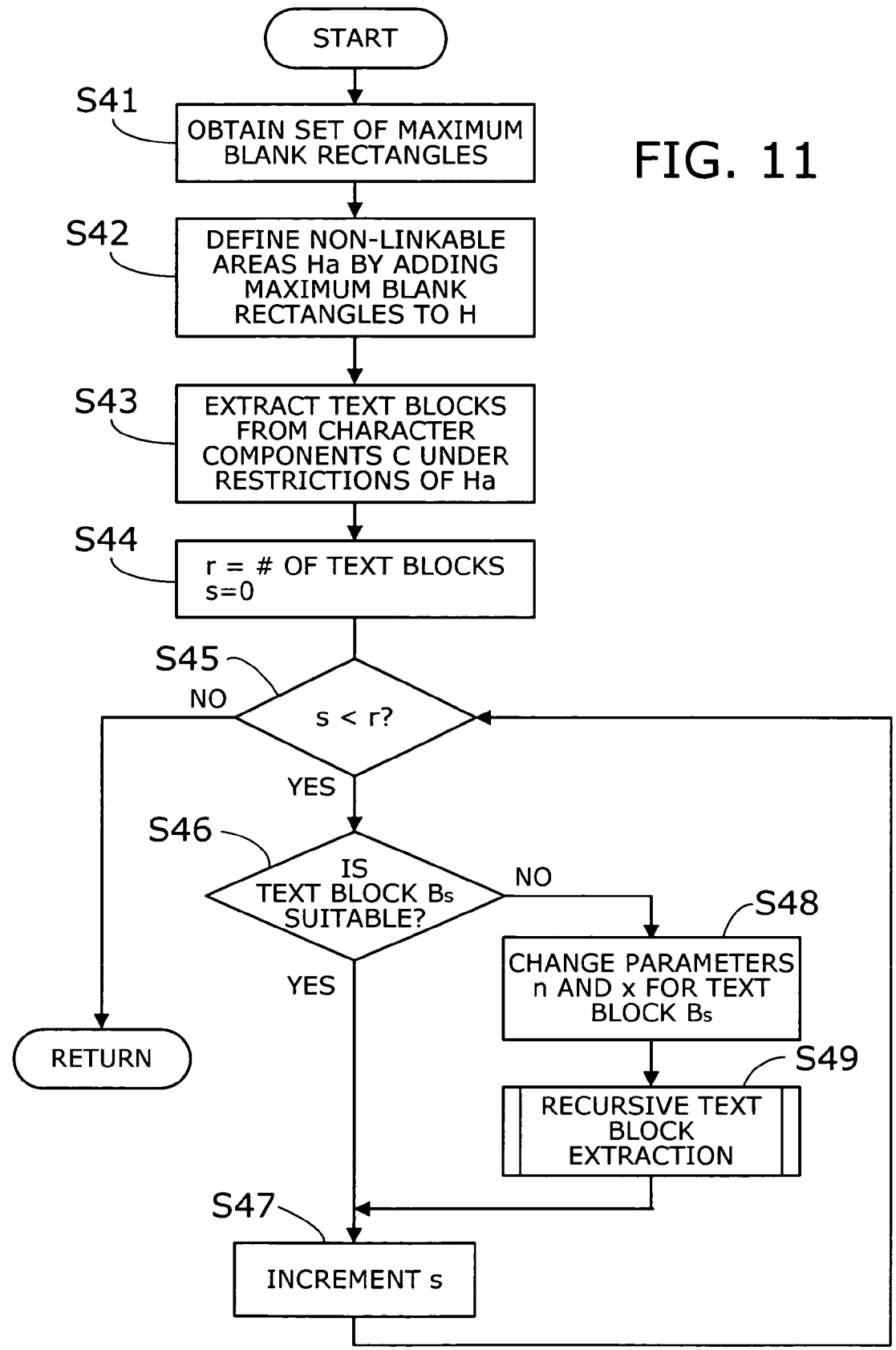
FIG. 11 is a flowchart showing a process of recursive text block extraction.

The above-described process of FIG. 7 enables every component in a given document image to be identified as either of character component, separator, figure, frame, and noise. As discussed in FIG. 6, the resulting component set is then directed to a recursive text block extraction process of step S22. Referring now to the flowchart of FIG. 11, the details of this process will be described below. The process of FIG. 11 includes the following steps:

(Step S41) The text block extractor 122 finds maximum blank rectangles in a rectangular area P in the given document image. The term "blank rectangle" refers to a rectangular image area containing no black pixels. From among those found in the document image, a blank rectangle that is not contained in any other blank rectangle is selected as a maximum blank rectangle.

Figure 12:
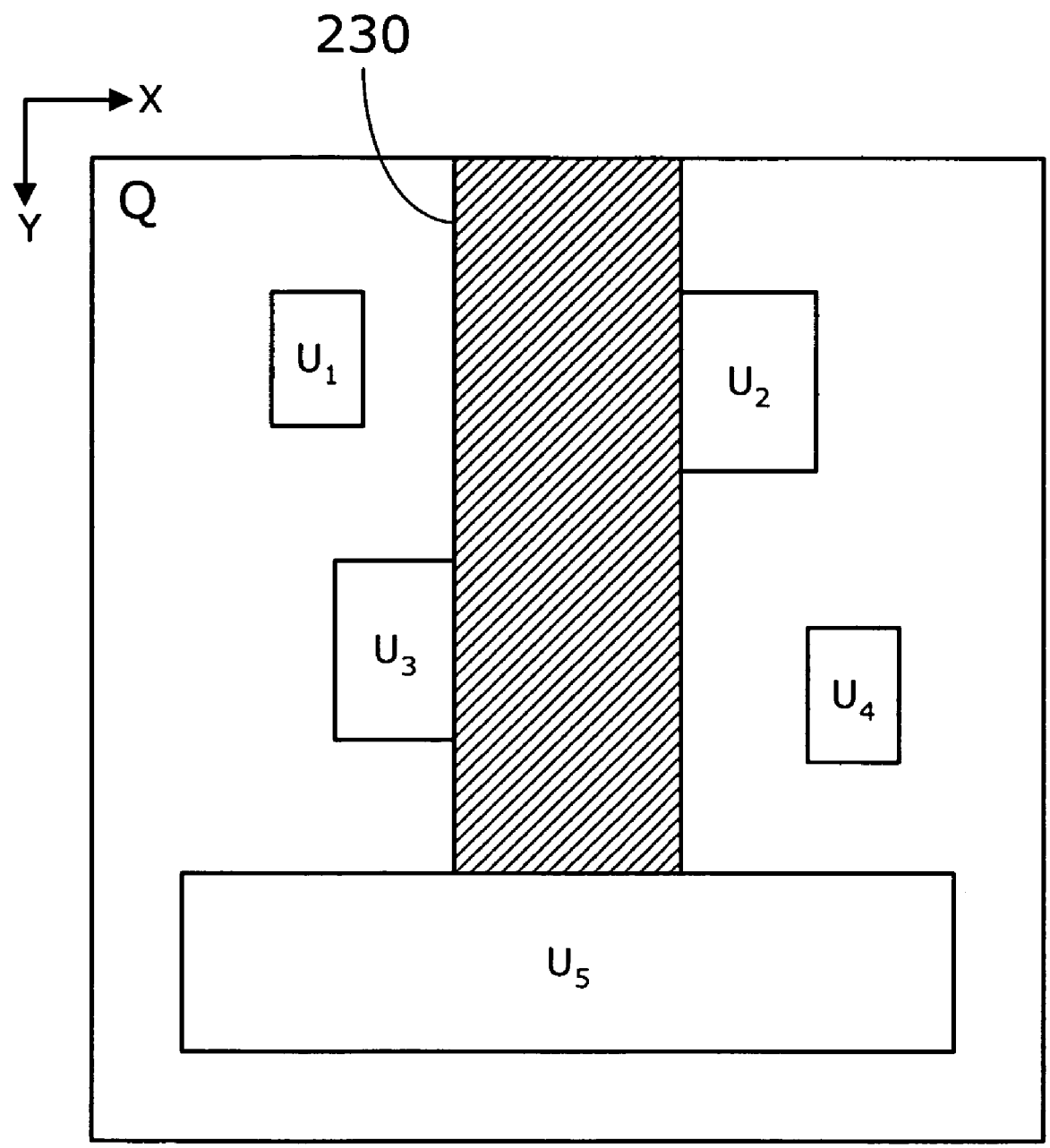
FIG. 12 is shows an example of a maximum blank rectangle.

FIG. 12 is shows an example of a maximum blank rectangle. Rectangular domain Q is a part of the given document image. This rectangular domain Q contains $S_Q = \{U_k \in Q, k=1, 2, \ldots n_s\}$, a set of circumscribed rectangles $U_k$ obtained at step S21 of FIG. 6, where $n_s$ represents the number of circumscribed rectangles in this rectangular domain Q. In the example of FIG. 12, $n_s$ is five.

Blank rectangles in domain Q are identified as rectangular areas overlapping with none of the circumscribed rectangles $U_k$ belonging to $S_Q$. Those blank rectangles found in the rectangular domain Q are referred to as "W blank rectangles in domain Q." Among the set of W blank rectangles in domain Q, those that are not contained in any other blank rectangle are represented as a set M(Q, W) and called "W maximum blank rectangles in domain Q." FIG. 12 shows a W maximum blank rectangle 230 that is the largest among M(Q, W). The membership of M(Q, W) is determined by control parameters n and x as shown in the following formula:

$$M_{n,x}(Q,W) = \{T \in M(Q,W) \mid \min(T^X, T^Y) \geq n \text{ and } \max(T^X, T^Y) \geq x\}$$

where $T^X$ is the horizontal (X-axis) length of a W maximum blank rectangle belonging to M(Q, W) and $T^Y$ is the vertical (Y-axis) length of the same. The expression $\min(T^X, T^Y) \geq n$ means that the shorter of $T^X$ and $T^Y$ is greater than or equal to control parameter n. Likewise, the expression $\max(T^X, T^Y) \geq x$ means that the longer of $T^X$ and $T^Y$ is greater than or equal to control parameter x.

The initial values of control parameters n and x are given as a parameter set selected from among the parameter set table 121. The text block extractor 122 updates those control parameters n and x in the course of recursive text block extraction. New values of n and x are determined according to, for example, the current depth of recursive calls, the size of text blocks, and the size of characters contained in them.

(Step S42) The members of $S_Q$ (set of circumscribed rectangles) can be divided into several subsets, depending on their respective attributes determined in the foregoing component attribute setting process. Specifically, let "C" represent a set of circumscribed rectangles of character components, and "H" represent that of frames, separators, and figures (i.e., of other than the character components). The latter set H is characterized as non-linkable areas that cannot be consolidated with any other circumscribed rectangles.

At step S42, the text block extractor 122 adds virtual separators to the existing set H of non-linkable areas. What is added here is actually a set of C∪H maximum blank rectangles, $M_{n,x}(Q, C \cup H)$, found in the rectangular domain Q discussed in step S41, where C∪H denotes the union of two sets C and H. The resulting set with new members is referred to by the name "Ha."

(Step S43) The text block extractor 122 consolidates the set C of circumscribed rectangles of character components, based on their proximity or homogeneity, under the restrictions of non-linkable areas Ha. Specifics of this process are disclosed in Japanese Patent Application Publication No. 11-219407 (1999). The consolidation process yields text blocks, as well as lines constituting each text block.

(Step S44) The text block extractor 122 initializes a loop counter s to zero, so that the subsequent steps S45 to S49 will be repeated until s reaches r, where r is the number of text blocks obtained at step S43.

(Step S45) The text block extractor 122 determines whether s is smaller than r. If so, the process advances to step S46. If s=r, it means that all text blocks $B_s$ found in the rectangular domain Q satisfy given text block validity criteria. Accordingly, the recursive text block extraction is finished, and control is returned to the calling process.

(Step S46) Since s<r, the text block extractor 122 selects the s-th text block $B_s$ from among those extracted at step S43. It then determines whether the selected text block $B_s$ satisfies the text block appropriateness criteria.

More specifically, the text block extractor 122 first tests whether each line of the text block $B_s$ has two or more characters in the perpendicular direction to that line. Note here that the line direction depends on whether the text flows vertically or horizontally. The above-stated test is to ensure that each single line contains a single stream of characters. If any misaligned characters are found in that line, the text block under test is determined to be invalid.

The text block extractor 122 then tests whether a predetermined number or more of lines constituting the text block $B_s$ intersect a particular blank area that is larger than the interval of characters. A text block containing a large blank area may probably be two separate text blocks and has therefore to be considered invalid.

The text block $B_s$ is found satisfying the validity requirements as a text block when it has passed all the above tests. If this is the case, the process advances to step S47. Otherwise, the process proceeds to step S48.

(Step S47) Now that the text block $B_s$ is validated, the text block extractor 122 increments the loop counter m by one and advances the process to step S45, so as to examine the next text block $B_{s+1}$.

1 (Step S48) Since step S46 has failed to validate the current text block $B_s$, the text block extractor 122 substitutes $B_s$ for the rectangular domain Q and redefines sets C and H as follows:

$$C=\{U \in C | U \cap Q \neq \phi\}$$

$$H=\{V \in H | V \cap Q \neq \phi\}$$

where U represent circumscribed rectangles of character components in the text block $B_s$, and V represents those of other components. The text block extractor 122 changes control parameters n and x according to new Q, C, and H.

(Step S49) With the control parameters updated at step S48, the text block extractor 122 calls the present process in a recursive manner, thereby executing again the same steps from S41. When the called process is finished (i.e., the control is returned), the process advances to step S47 to test the next text block $B_{s+1}$.

According to the present embodiment, the text block extractor 122 reduces both n and x before making a recursive call at step S48. That is, the text block extractor 122 reduces the size of maximum blank rectangles, or virtual separators, to analyze a text block $B_s$ that does not satisfy the validity requirements. This tactics solves the problem of excessive consolidation of character components (e.g., mistakenly recognizing multiple lines as a single line), which could happen in a document where text blocks and figures are mixed in a complex arrangement.

Text Block Consolidation

The text block extraction process described in the previous section produces a plurality of text block extraction results corresponding to different parameter sets. Those results then undergo the text block consolidation process (step S16 in FIG. 5). The following will provide the details of this process.

The i-th text block extraction result $R_i$ obtained with a parameter set P(i) is expressed as $R_i = \{T_i^j | j=0,1,2, \ldots t(i)\_num-1\}$. $T_i^j$ represents the j-th text block in $R_i$, and $t(i)\_num$ is the total number of text blocks belonging to $R_i$. Let $S_T$ be a set of text blocks that are subjected to consolidation with $T_i^j$.

FIG. 13 shows an example of text block consolidation. It is assumed here that two extraction results $R_0$ and $R_1$ are given. Suppose that the document layout analyzer 120 needs to extract text blocks for consolidation with the first text block $T_0^1$ of $R_0$. To achieve this task, the text block consolidator 123 first looks into $R_1$ to extract a text block that overlaps at least partly with the specified text block $T_0^1$. The text block consolidator 123 then explores $R_0$ to extract a text block that overlaps at least partly with the text block extracted from $R_1$. The text blocks found in this way are to be consolidated together.

The text block consolidator 123 repeats the above steps to identify other overlapping text blocks until no further text block can be extracted. In the example of FIG. 13, the text block consolidator 123 seeks text blocks relevant to $T_0^1$ and finally obtains a set of text blocks, $S_T = \{T_0^1, T_0^2, T_1^1, T_1^2, T_1^3\}$, to be consolidated.

Figure 14:
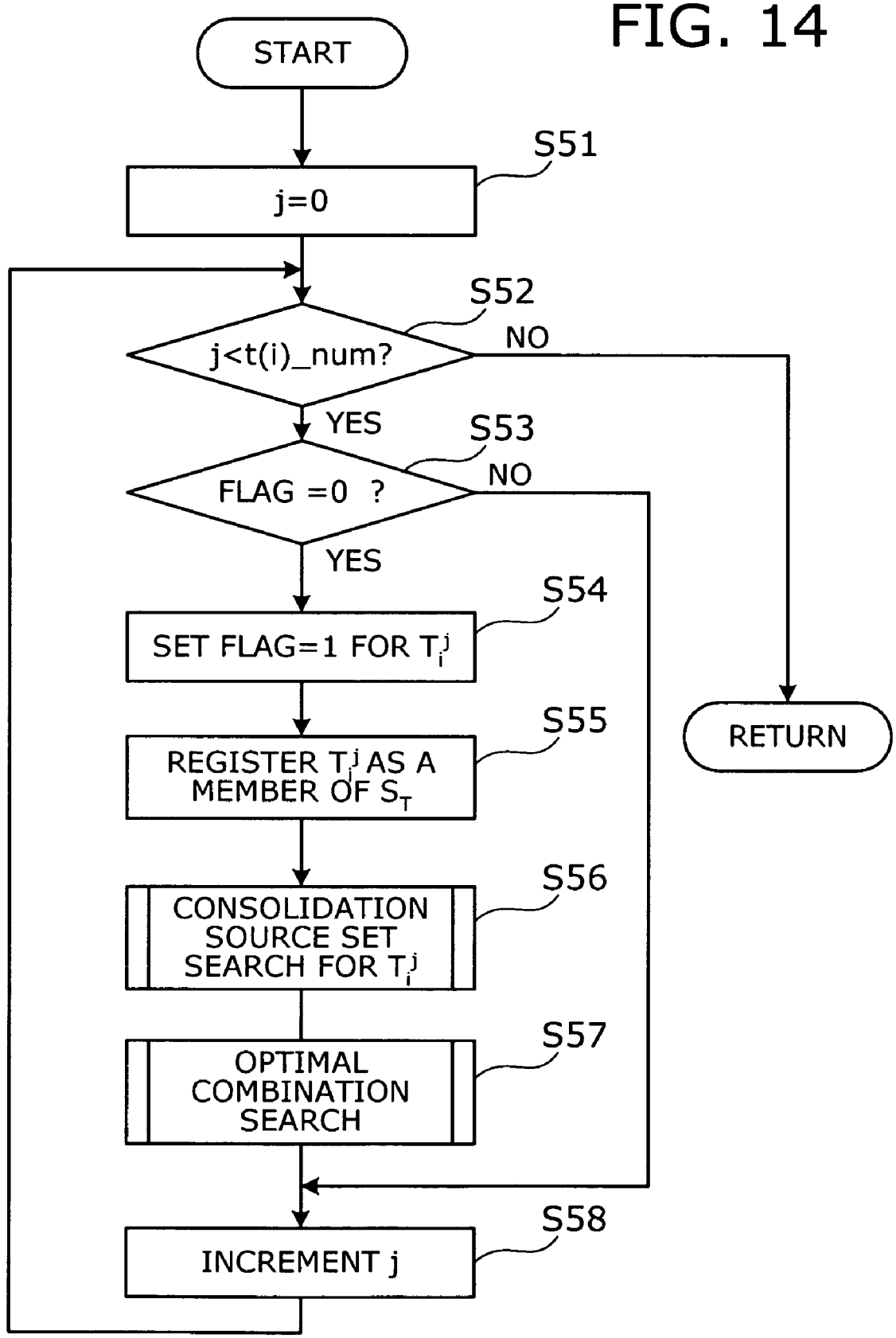
FIG. 14 is a flowchart showing a process of consolidating extracted text blocks.

FIG. 14 is a flowchart of the text block consolidation process. With a batch method, the text block consolidator 123 extracts text blocks overlapping with $\{T_0^j (j=0,1,2, \ldots t(0)\_num-1)\}$ out of $\{T_i^j | i=1,2, \ldots p\_num-1, j=0,1,2, \ldots t(i)\_num-1\}$. Each text block in a text block extraction result has a flag indicating whether the text block consolidator 123 has ever examined that block as a subject of consolidation. The flags are initialized to zero, indicating that the text blocks have not been examined. They are set to one when examined. The process of FIG. 14 includes the following steps:

(Step S51) The text block consolidator 123 initializes j to zero.

(Step S52) The text block consolidator 123 determines whether j is smaller than $t(i)\_num$. If $j<t(i)\_num$, then the process advances to step S53. If $j=t(i)\_num$, then control is returned from the present process to the calling process.

(Step S53) The text block consolidator 123 determines whether the flag of $T_i^j$ is zero. If so, the process advances to step S54. If not, the process skips to step S58.

(Step S54) The text block consolidator 123 sets the flag of $T_i^j$ to one.

(Step S55) The text block consolidator 123 registers $T_i^j$ as a member of $S_T$.

(Step S56) The text block consolidator 123 calls a consolidation source set search to find candidate text blocks that can be consolidated with $T_i^j$.

(Step S57) The text block consolidator 123 calls a best combination search to find an optimal combination.

(Step S58) The text block consolidator 123 increments j by one before going back to step S52.

In the consolidation source set search called at step S56, the text block consolidator 123 retrieves all text blocks $T_m^N$ ($m \neq i$) that overlap with $T_i^j$ and registers $T_m^N$ as members of a consolidation source set $S_T$. Further, in a recursive manner, the text block consolidator 123 seeks text blocks $T_p^q$ ($p \neq m$) that overlap with $T_m^N$ and registers $T_p^q$ also as members of $S_T$.

Figure 15:
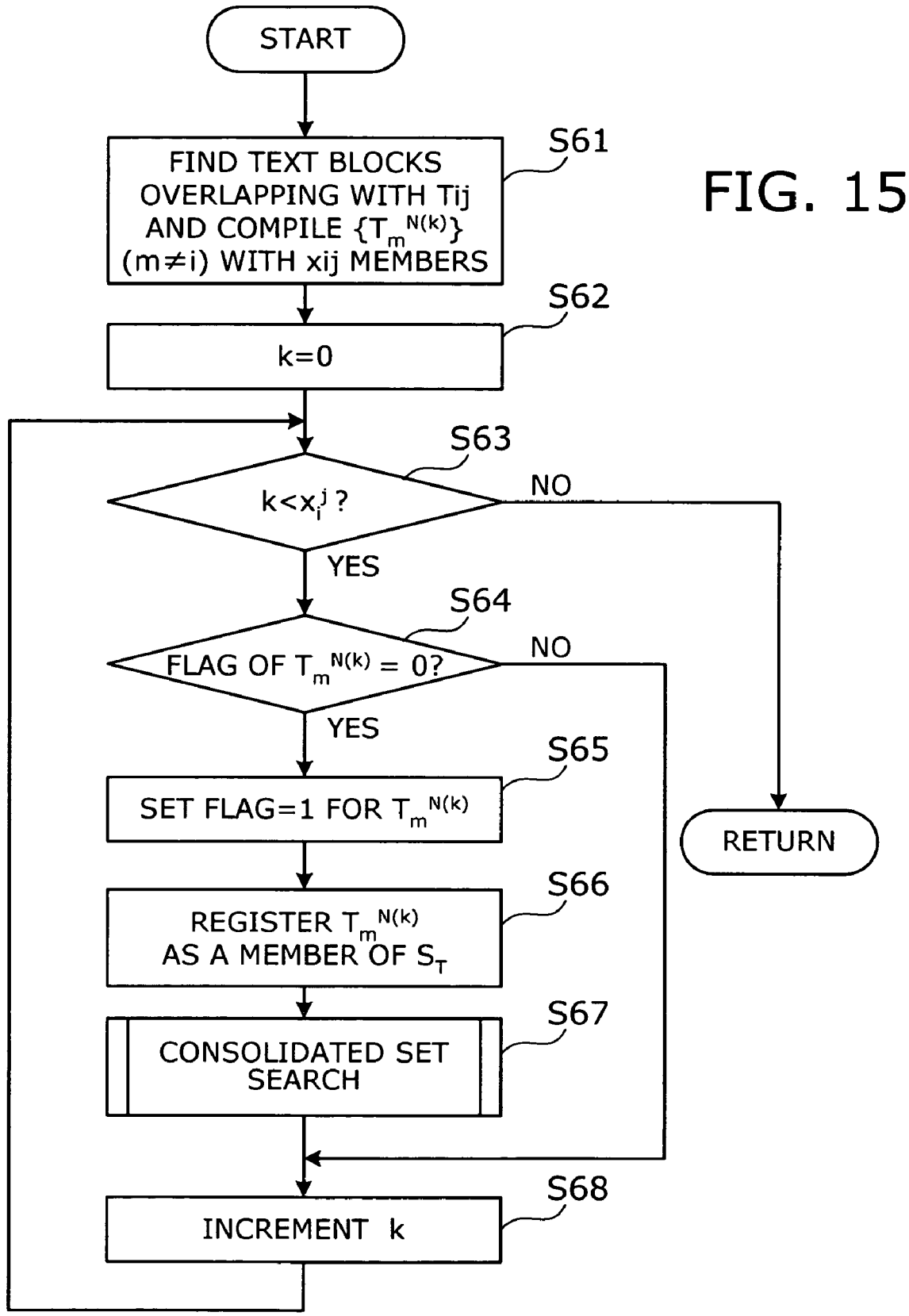
FIG. 15 is a flowchart showing a process of searching for a consolidation source set.

FIG. 15 is a flowchart showing the process of consolidation source set search, which is called at step S56. This process includes the following steps:

(Step S61) Out of other text block extraction results $$\{T_i^j | i=0,1,2, \ldots p\_num-1, j=0,1,2, \ldots t(i)\_num-1\}$$

(assuming batch method), the text block consolidator 123 selects text blocks overlapping at least partly with $T_i^j$, thereby compiling a text block set $\{T_m^{N(k)}\}$ ($m \neq i$) with $x_i^j$ members. Here, k is an index number for specifying a particular overlapping text block, where $0 \leq k < x_i^j$. N(k) is an index number to specify where in the text block extraction result the k-th text block is.

More specifically, when called at step S56 of FIG. 14, the consolidation source set search process produces at step S61 a set of text blocks overlapping at least partly with the text block extraction result $\{T_0^j\}$ for i=0, where the value of j is given at step S51 or S58 of FIG. 14. When called recursively at step S67, the consolidation source set search process yields a set of text blocks overlapping at least partly with a text block $T_m^{N(k)}$ that has been registered as a member of $S_T$ at the preceding step S66.

(Step S62) The text block consolidator 123 initializes k to zero.

(Step S63) The text block consolidator 123 determines whether k is smaller than $<x_i^j$. If so, the process advances to step S64. If k has reached $x_i^j$, the present process terminates itself and returns control to the calling process.

(Step S64) The text block consolidator 123 examines the flag of $T_m^{N(k)}$. If it is zero, the process advances to step S65. If it is one, the process skips to step S68.

(Step S65) The text block consolidator 123 sets the flag of $T_m^{N(k)}$ to one.

(Step S66) The text block consolidator 123 registers $T_m^N$(k) as a member of $S_T$.

(Step S67) The text block consolidator 123 makes a recursive call for the consolidation source set search process itself, with an argument $T_m^{N(k)}$. When control is returned from the recursive call, the process advances to step S68.

(Step S68) The text block consolidator 123 increments k by one and advances the process back to step S63.

The above steps permit a consolidation source set search to be executed in a recursive way.

Figure 16:
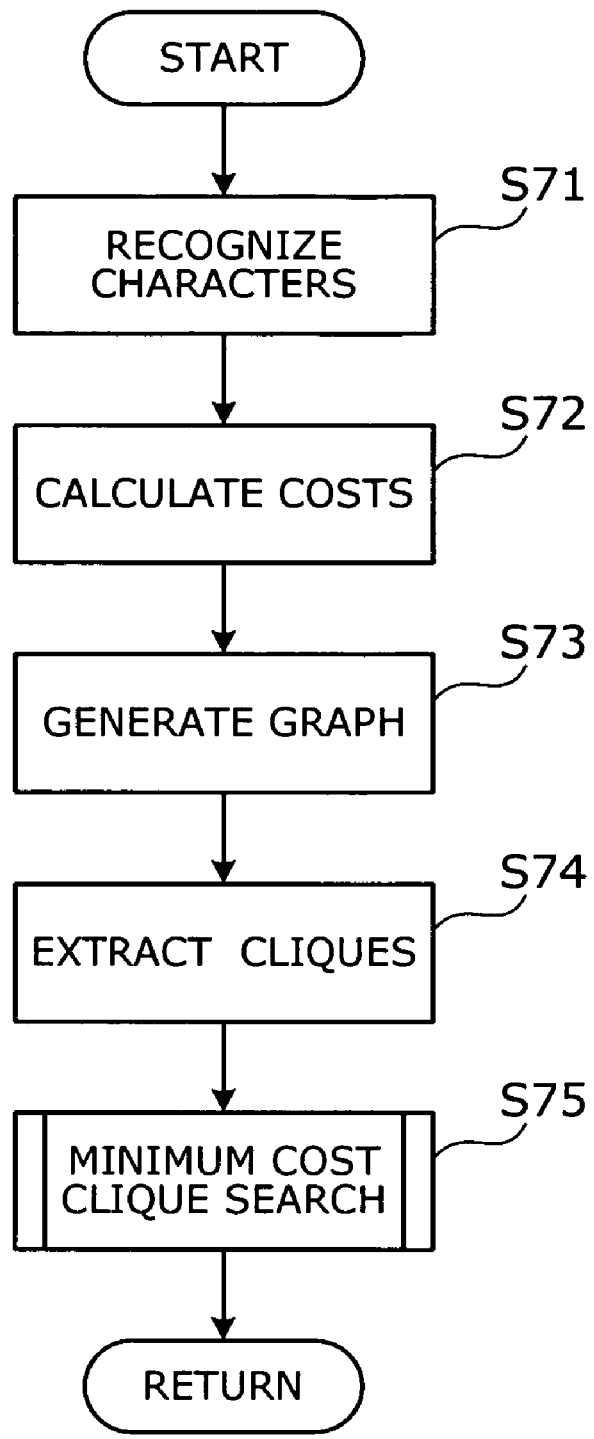
FIG. 16 is a flowchart showing a process of searching for an optimal combination.

Referring now to the flowchart of FIG. 16, the details of best combination search will be described below. Specifically, the process of FIG. 16 includes the following steps:

(Step S71) The text block consolidator 123 subjects each text block belonging to the given consolidation source set $S_T$ to a character recognition process. This recognition process is followed by a post-processing step of linguistic evaluation (i.e., testing whether the recognized text is linguistically natural or not).

(Step S72) For each text block, the text block consolidator 123 evaluates the recognized text in terms of cognitive cost and linguistic cost. Here, the cognitive cost comes from accuracy of recognition, while the linguistic cost is based on the cost in morphemic analysis. The text block consolidator 123 attaches such cost values to each evaluated text block in $S_T$.

(Step S73) The text blocks in $S_T$ may be combined in various ways. The text block consolidator 123 first creates a graph to investigate possible combinations. Specifically, text blocks are represented as nodes of a graph, where the presence of a node-to-node path indicates that the corresponding text blocks can exist together as independent blocks.

(Step S74) The text block consolidator 123 extracts cliques of the graph to obtain logical minimum combinations. The extracted cliques are candidates for an optimal combination.

(Step S75) The text block consolidator 123 sorts the extracted candidates in the order of their cognitive costs and linguistic costs and chooses one minimum-cost combination as the final solution.

The last step S75 is accomplished by performing what will be described in FIG. 17 as the minimum cost clique search. According to the present embodiment, the text block consolidator 123 compares every pair of candidate cliques and adds a point to one of the two that is deemed to be superior to the other. The cliques are then ranked in accordance with the total points that they have earned. Decision of superiority is based on the cognitive and linguistic costs mentioned above. Specifically, the cognitive cost is the reciprocal of a recognition accuracy rate, and the linguistic cost is a morphemic analysis cost.

Figure 17:
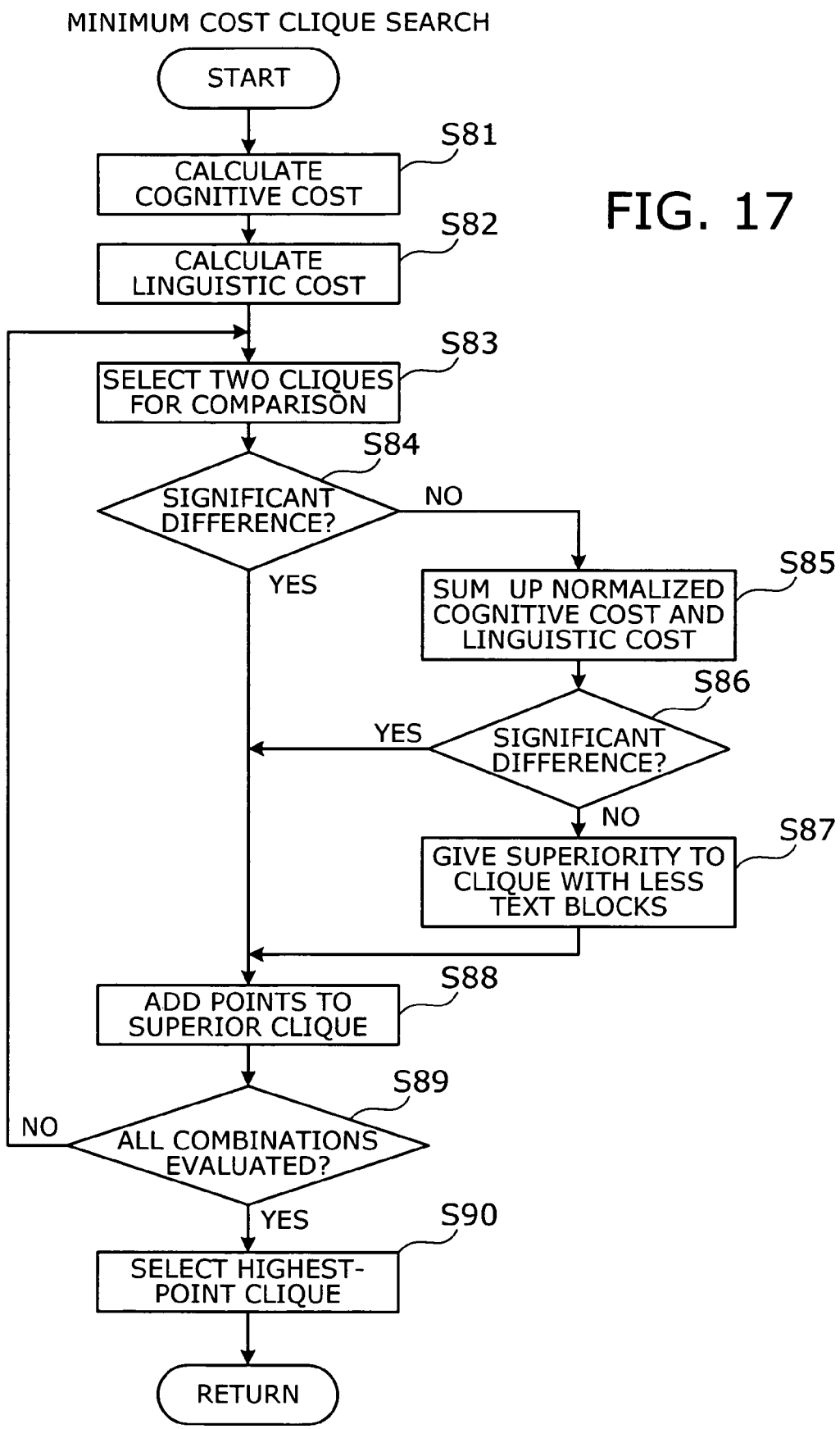
FIG. 17 is a flowchart showing a process of finding a minimum cost clique.

FIG. 17 is a flowchart showing the minimum cost clique search process. This process includes the following steps:

(Step S81) The text block consolidator 123 calculates the cognitive cost of each clique. The cognitive cost is a value related to the accuracy of recognized characters that are obtained by performing character recognition in corresponding text blocks. The higher the accuracy rate, the lower the cognitive cost.

(Step S82) The text block consolidator 123 calculates the linguistic cost of each clique. The linguistic cost of a given series of characters (or a sentence) represents its validity evaluated from a linguistic viewpoint. This value is obtained as a result of character recognition. The more valid the text, the lower the linguistic cost.

(Step S83) The text block consolidator 123 selects two cliques for comparison.

(Step S84) The text block consolidator 123 compares one selected clique with the other in terms of their cognitive costs and linguistic costs, thus determining whether there is a significant difference between the two. The term "significant difference" means a difference exceeding a predetermined threshold, which is, for example, 10 for cognitive costs and 50 for linguistic costs. If a significant difference is observed in either or both of cognitive and linguistic costs, then the text block consolidator 123 chooses the lower-cost clique as being superior to the other. In the case where one clique is superior in cognitive cost, but inferior in linguistic cost, or the other way around, the text block consolidator 123 determines, for example, that they have no significant difference.

If a significant difference is found, the process advances to step S88. Otherwise, the process branches to step S85.

(Step S85) For each of the cliques compared, the text block consolidator 123 calculates a sum of normalized cognitive and linguistic costs. Here, normalized cognitive cost refers to a recognition accuracy, while normalized linguistic cost is obtained by calculating the reciprocal of linguistic cost and multiplying it by a certain constant.

As an alternative method of normalizing linguistic costs, the text block consolidator 123 may calculate linguistic costs of many samples (i.e., extracted text blocks including valid ones and failed ones) beforehand. The text block consolidator 123 creates a lookup table containing linguistic cost values in association with recognition accuracy rates of those samples. This lookup table allows the text block consolidator 123 to covert given linguistic cost values to estimated recognition accuracy rates for use as normalized linguistic costs.

(Step S86) The text block consolidator 123 compares the two cliques in terms of the sum of normalized costs, thus determining whether there is a significant difference between them. If a significant difference is observed, the text block consolidator 123 chooses the clique with a lower normalized value as being superior to the other. The process then advances to step S88. If no significant difference is found, the process proceeds to step S87.

(Step S87) The text block consolidator 123 chooses a clique with fewer text blocks as being superior to the other.

(Step S88) The text block consolidator 123 adds one point, for example, to the clique that is determined to be superior.

(Step S89) The text block consolidator 123 checks whether all combinations of cliques have been evaluated. If so, the process advances to step S90.

If there is an unevaluated combination, the process goes back to step S83.

(Step S90) The text block consolidator 123 extracts the highest-point clique from among the candidate cliques. The process of FIG. 17 thus yields a minimum cost clique.

Analysis Example

The preceding sections have discussed how to extract text blocks with different parameter sets and how to consolidate the extracted text blocks. In this section, we will present a specific example of document layout analysis according to the present invention.

Figure 18:
FIG. 18 shows an example of a document image to be analyzed.

FIG. 18 shows an example of a document image to be analyzed. This document image 300 contains some captions in horizontal flow, several blocks of text in vertical flow, and a graphic image. Upon receipt of this document image 300, the document layout analyzer 120 activates its text block extractor 122 to extract text blocks by using each predefined parameter set.

Figure 19:
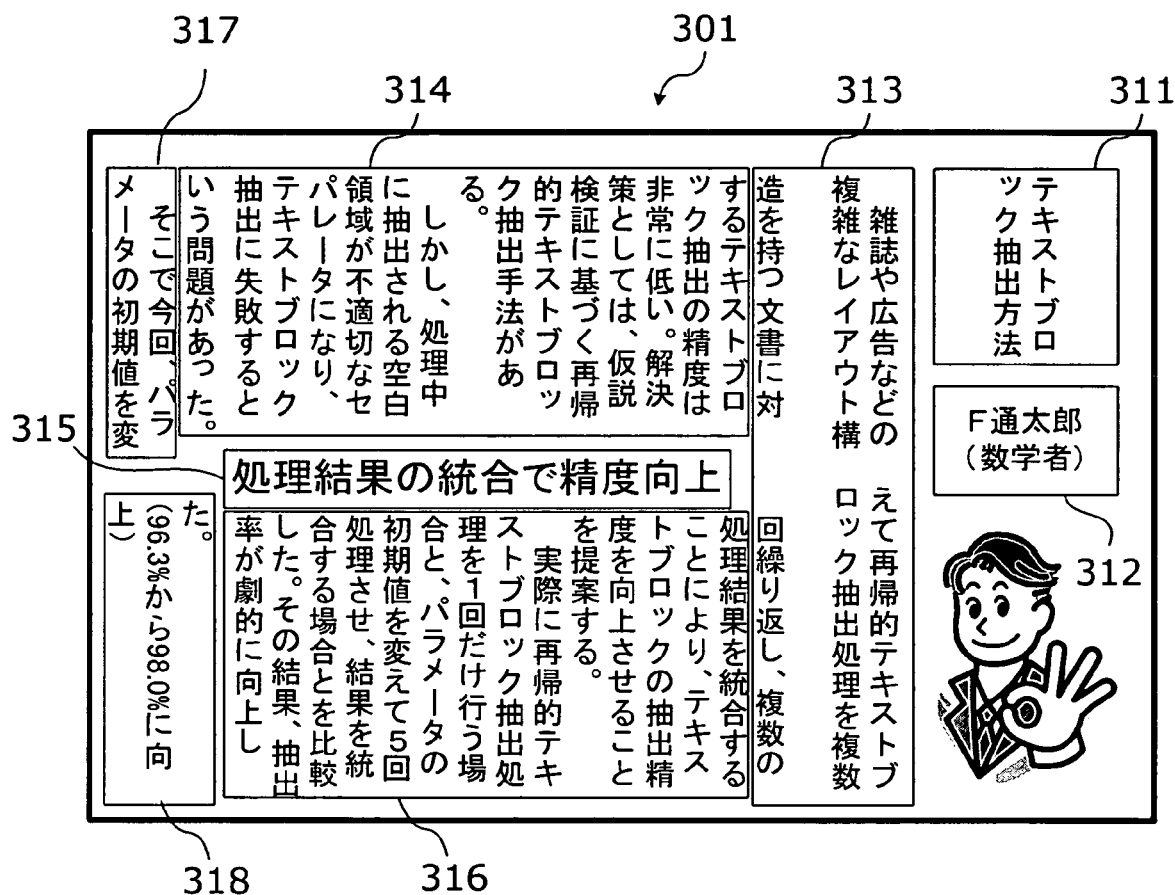
FIG. 19 shows a first example result of text block extraction.

FIG. 19 shows a first example result of text block extraction. As seen from this first text block extraction result 301, eight text blocks 311 to 318 are extracted from the source document image 300. The text block 313 is, however, inappropriate for character recognition purposes because it covers two separate columns of text. The character recognition would produce an incomprehensible sentence at this part.

Figure 20:
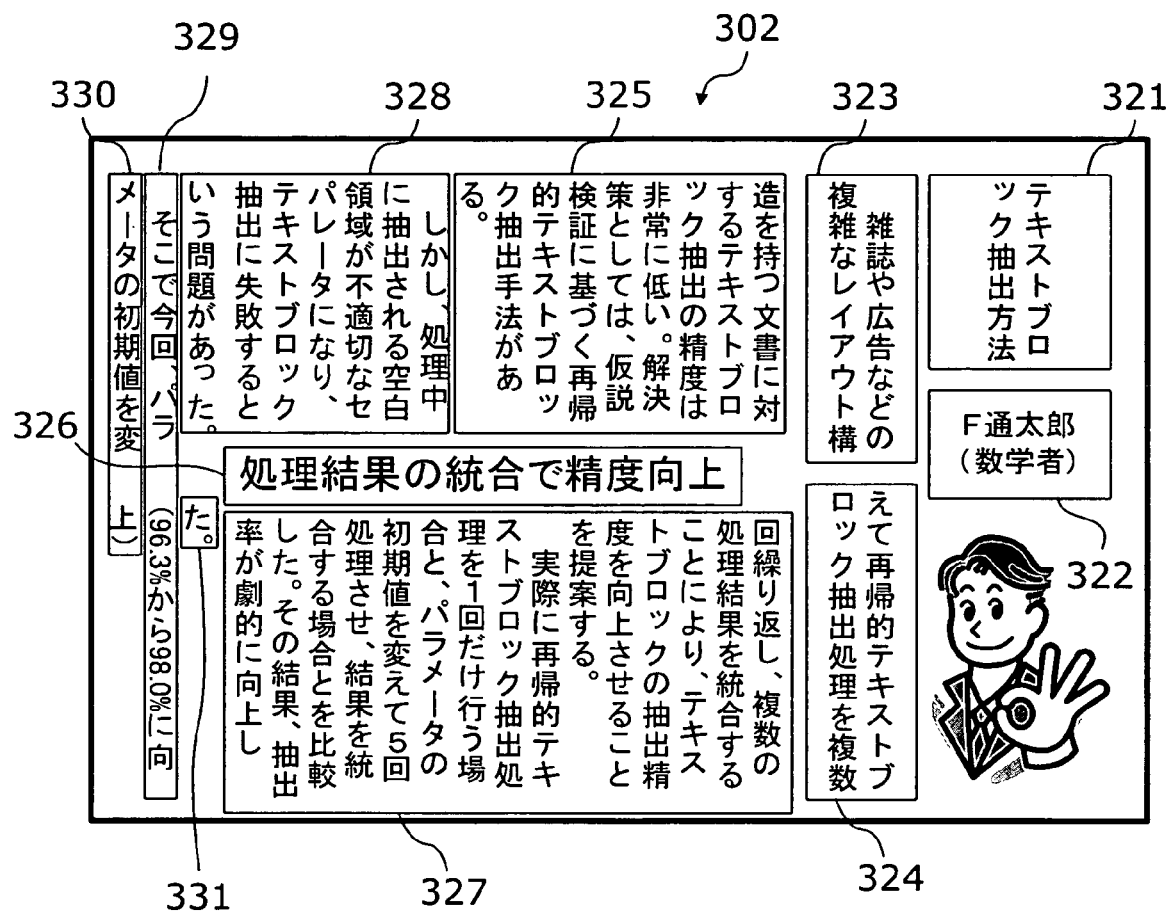
FIG. 20 shows a second example result of text block extraction.

FIG. 20 shows a second example result of text block extraction. As seen from this second text block extraction result 302, eleven text blocks 321 to 331 are extracted from the source document image 300. However, the text blocks 329 and 330 cover two separate columns of text. The character recognition would produce an incomprehensible sentence at this part.

According to present embodiment, the text block consolidator 123 selects an appropriate combination of text blocks from the two extraction results illustrated in FIGS. 19 and 20. The text block consolidator 123 begins this task with a consolidation source set search on the text block extraction results 301 and 302 to collect source text blocks for consolidation.

Figure 21:
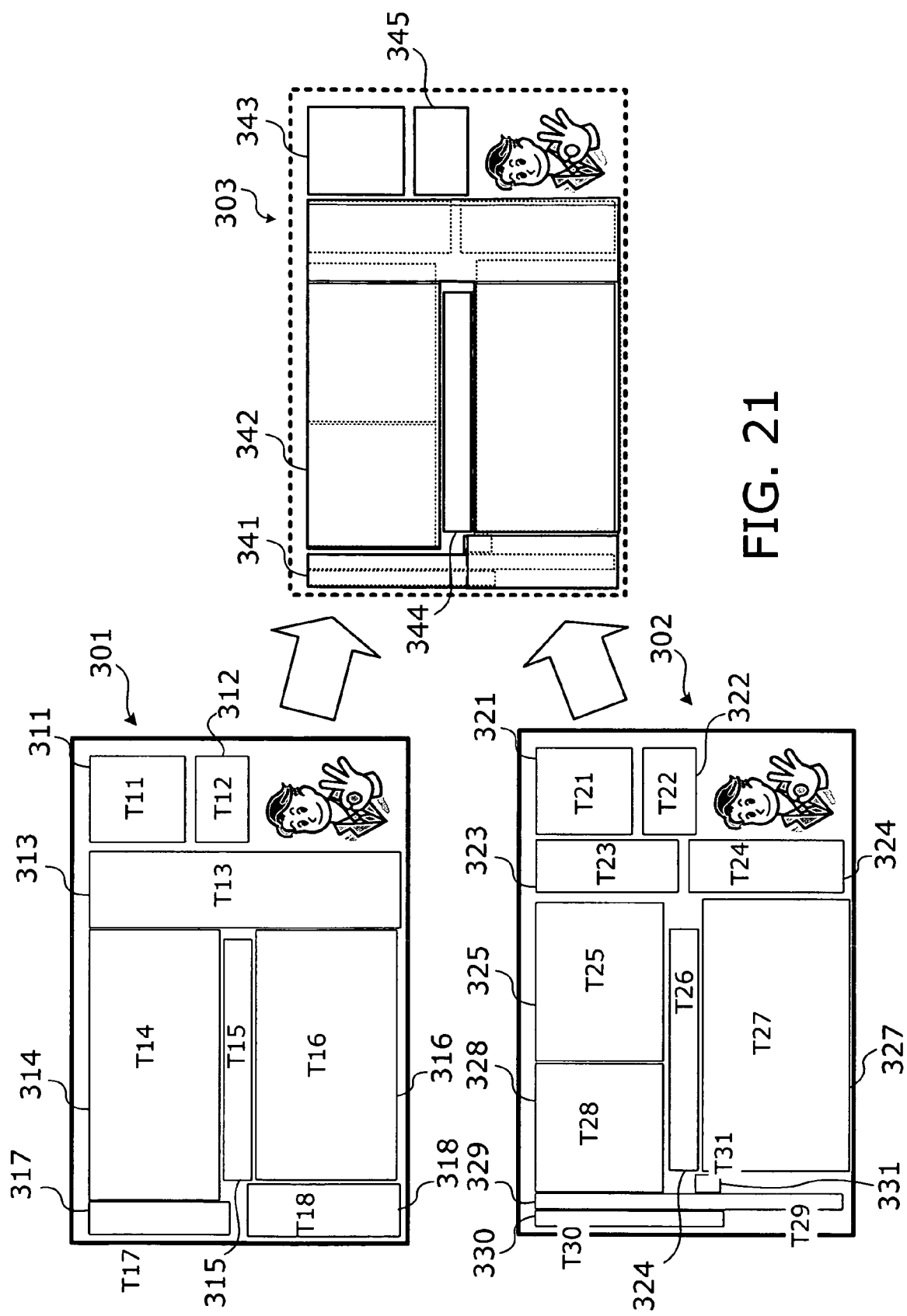
FIG. 21 shows an example result of consolidation source set search.

FIG. 21 shows an example result of consolidation source set search. Each text block extraction result 301 and 302 includes a plurality of text blocks, and the text block consolidator 123 manages those text blocks by using their identifiers. In the example of FIG. 21, text blocks 311 to 318 in the first text block extraction result 301 have identifiers T11, T12, . . . T18, respectively. Likewise, text blocks 321 to 331 in the second text block extraction result 302 have their identifiers T21, T22, . . . T31, respectively. By searching those text block extraction result 301 and 302, the text block consolidator 123 obtains five consolidation source sets 341 to 345 each composed of one or more candidate text blocks. These source sets are collectively referred to as a consolidation source set search result 303.

The last consolidation source set 345 is formed from two text blocks covering the same text area, which can readily be consolidated into a single text block. This is also true in other two consolidation source sets 343 and 344. By contrast, the remaining two consolidation source sets 341 and 342 contain a plurality of dissimilar text blocks. It is therefore necessary to choose appropriate text blocks from among those consolidation source sets 341 and 342 so as to form an optimal combination. The text block consolidator 123 achieves this by conducting an optimal combination search on each consolidation source set 341 and 342.

Figure 22:
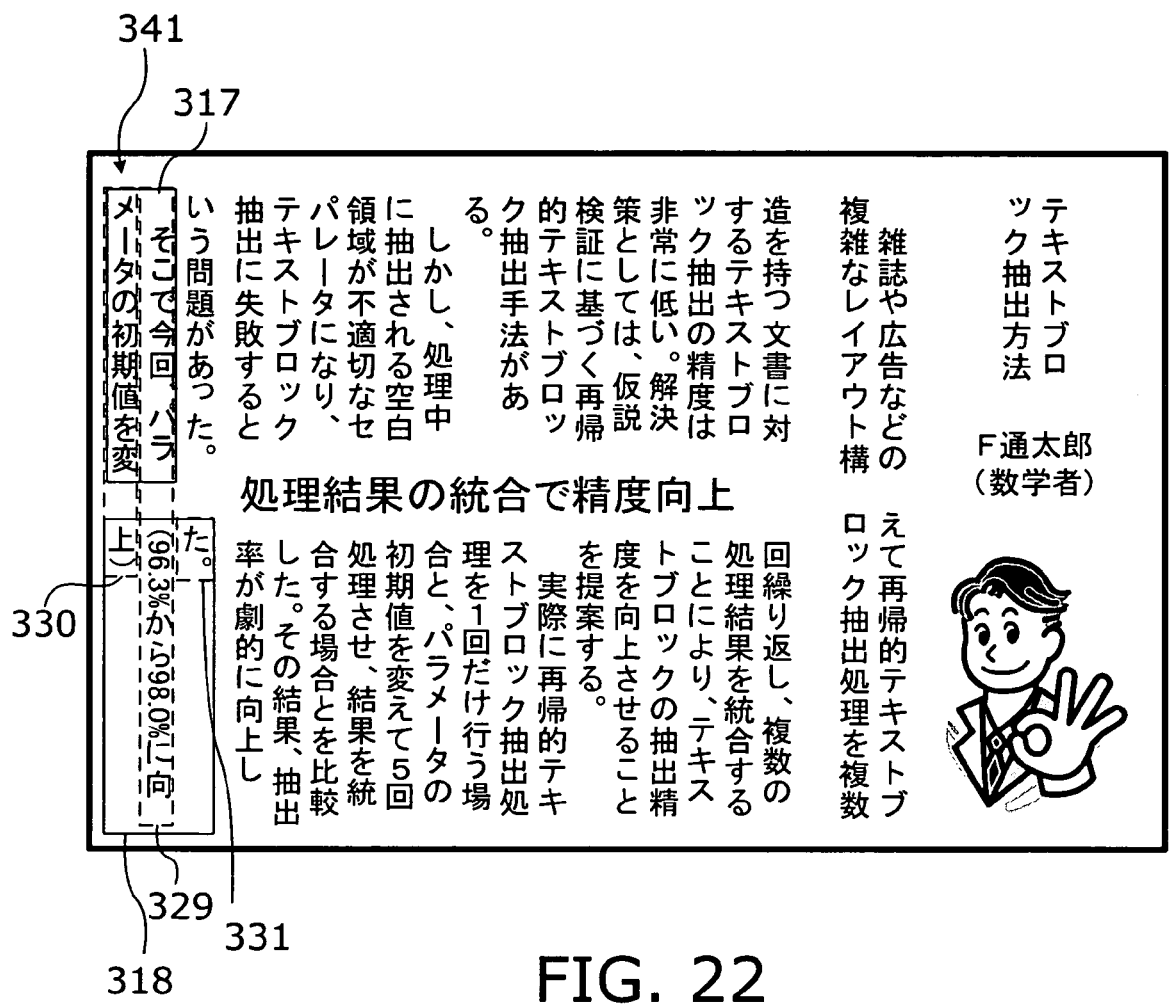
FIG. 22 shows a first example of a consolidation source set.

Referring first to FIG. 22, the consolidation source set 341 consists of two text blocks 317 and 318 originated from one text block extraction result 301 and three text blocks 329 to 331 from the other text block extraction result 302. While being separate from text blocks 318 and 331, the text block 317 overlaps with the other two text blocks 329 and 330. The text block 318 shares some common portions with other text blocks 329 to 331, while being apart from the text block 317. No overlap exists between text blocks 329 to 331.

Figure 23:
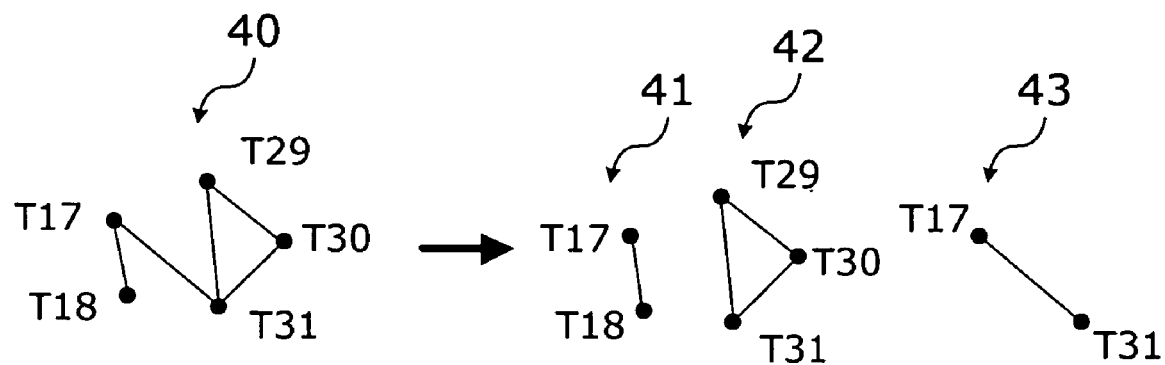
FIG. 23 shows a first example of a graph and its cliques.

The text block consolidator 123 creates a graph representing the block-to-block relationships stated above, and it then extracts cliques from that graph. FIG. 23 shows a first example of a graph and its cliques. The illustrated graph 40, which is produced from the consolidation source set 341, has five nodes each representing a text block. Symbols written beside individual nodes are identifiers of corresponding text blocks.

Each node-to-node path (line segment) shows the relationship between nodes. Specifically, the presence of an interconnecting path denotes that the corresponding text blocks have no overlaps and can therefore exist together as independent blocks.

Figure 24:
FIG. 24 shows a result of cost calculation.

The graph 40 permits a minimum number of independent combinations to be logically obtained as its subgraphs, or cliques 41 to 43. More specifically, a clique contains a plurality of nodes, and all those nodes have to be interconnected by paths. The text block consolidator 123 divides the graph 40 into such cliques and calculates cognitive and linguistic costs of each clique. FIG. 24 shows a result of cost calculation. This example assumes that the first clique 41 has a cognitive cost of 105 and a linguistic cost of 250. Likewise, the second clique 42 has a cognitive cost of 160 and a linguistic cost of 1440. The third clique 43 has a cognitive cost of 235 and a linguistic cost of 780.

As apparent from FIGS. 20 and 21, the text block 331 named "T31" contains only one Japanese Hiragana character accompanied by one small punctuation symbol. Because it is difficult to define correct character-symbol boundaries in such a case, the character recognition in the text block 331 is likely to fail and thus result in a higher cognitive cost. Other text blocks 329 and 330 respectively named "T29" and "T30" have a larger linguistic cost since their text content is a mixture of unrelated sentences. For this reason, the second and third cliques 42 and 43 containing the above-noted nodes "T29," "T30," and "T31" would have higher linguistic costs, relative to that of the first clique 41. Thus the text block consolidator 123 is expected to choose the first clique 41 as a minimum cost clique.

Figure 25:
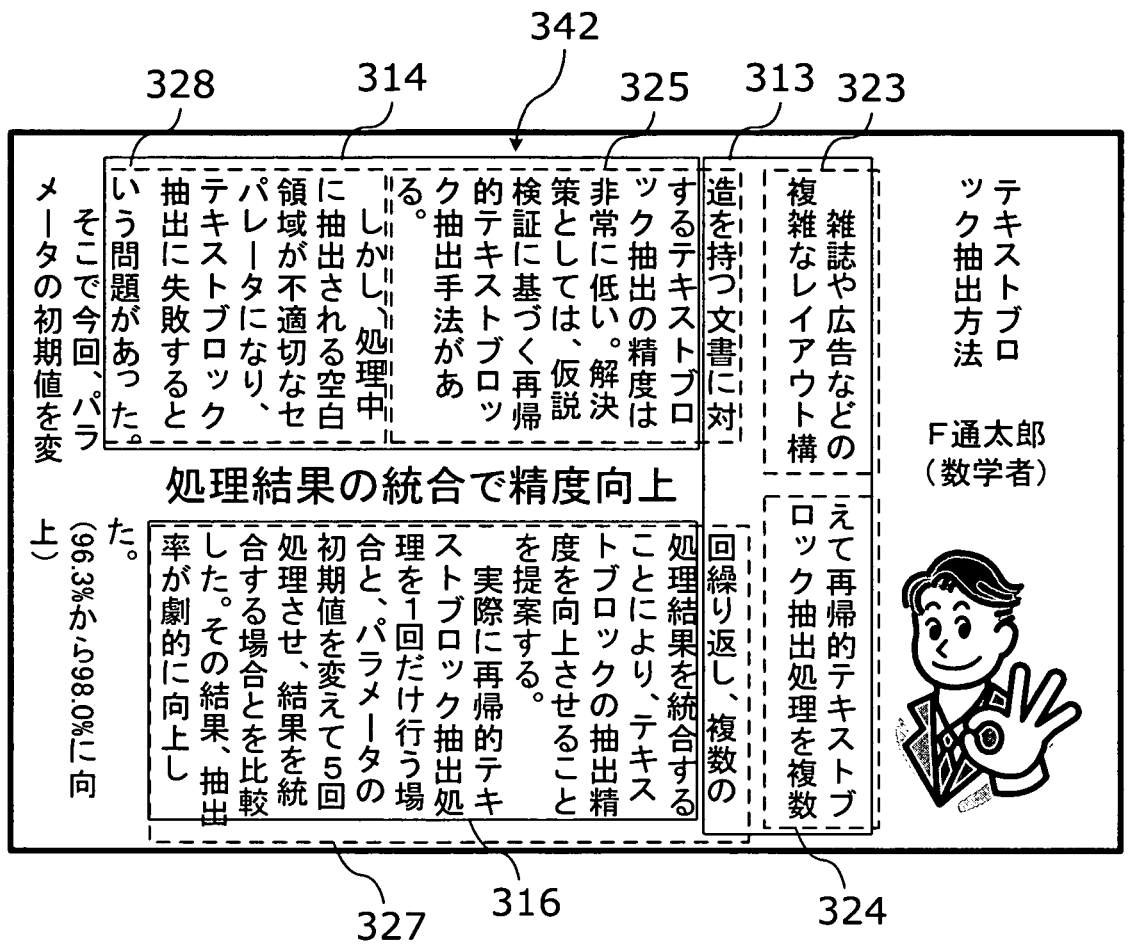
FIG. 25 shows a second example of a consolidation source set.
Figure 26:
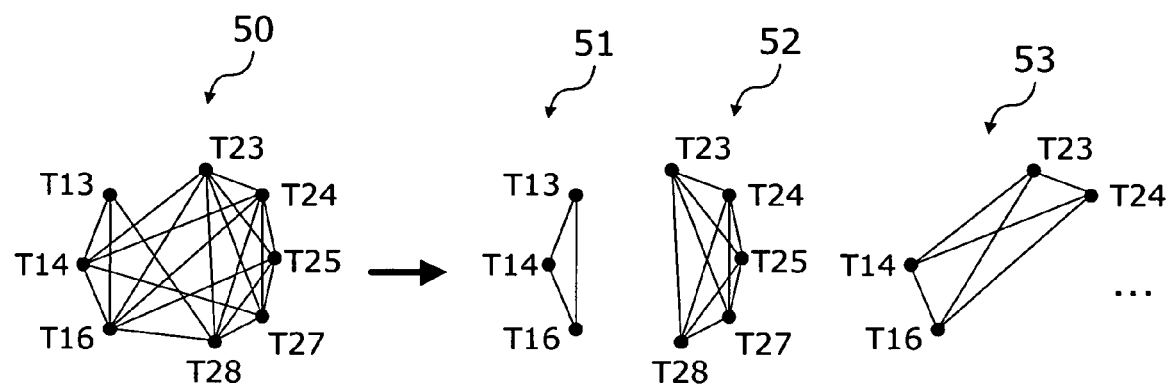
FIG. 26 shows a second example of a graph and its cliques.

Referring next to FIG. 25, another consolidation source set 342 will now be investigated. This consolidation source set 342 consists of three text blocks 313, 314, and 316 originating from the first text block extraction result 301 and five text blocks 323 to 325, 327, and 328 originating from the second text block extraction result 302. The text block consolidator 123 produces a graph from the consolidated source set 342 and extracts cliques from that graph as depicted in FIG. 26. The graph 50 with eight nodes permits a minimum number of independent combinations to be logically obtained as its cliques 51, 52, 53, and so on. The subsequent minimum cost clique search yields a minimum cost clique, which is the second clique 52 in the present example case.

Figure 27:
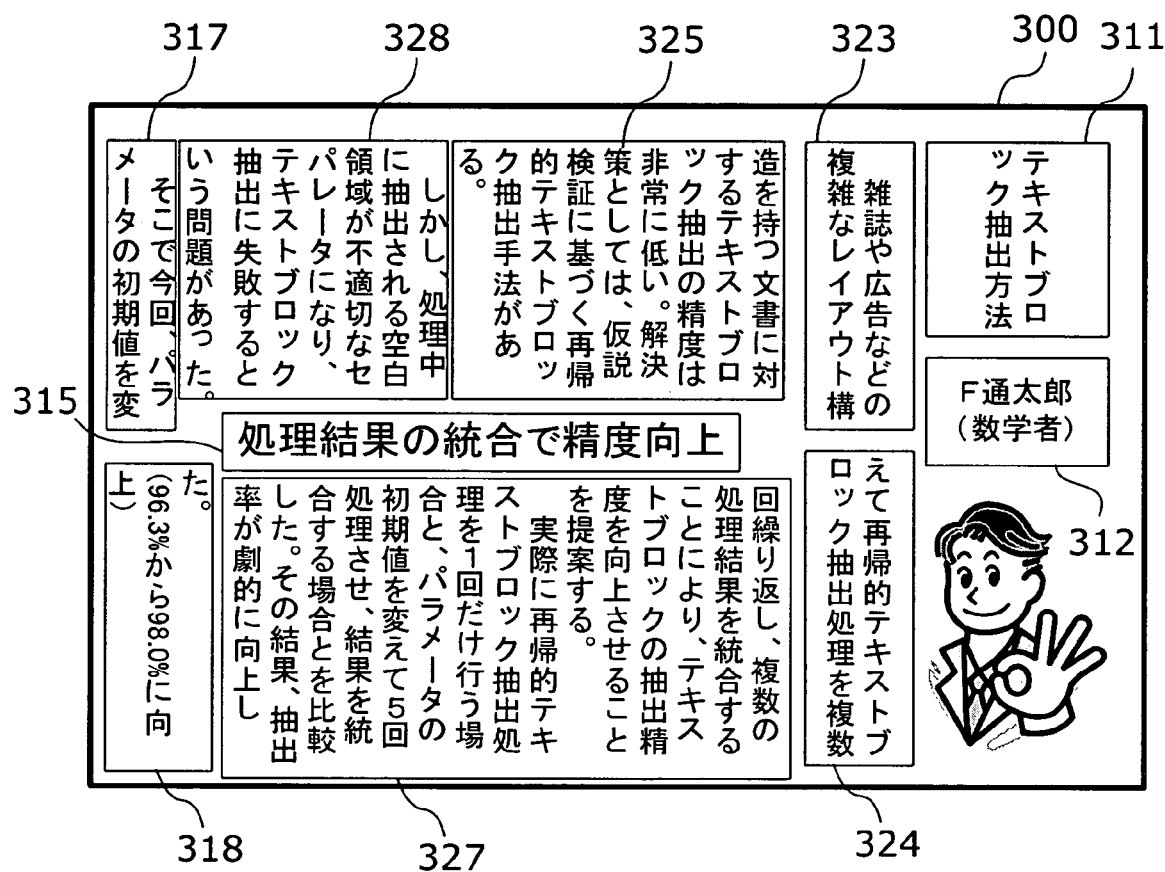
FIG. 27 shows a consolidated result of extracted text blocks.

Finally, the text block consolidator 123 combines the minimum cost cliques determined from two consolidation source sets 341 and 342, thereby compiling a consolidated set of text blocks. FIG. 27 shows the result of consolidation in the present example. As can be seen from this diagram, the text block consolidator 123 has selected appropriate text blocks from among those in multiple text block extraction results and has consolidated them into a correct set of text blocks.

Particularly, the first text block extraction result 301 has a problem in its constituent text blocks 313, 314, and 316. To circumvent the problem, the text block consolidator 123 chooses text blocks 323 to 325, 327, and 328 from the second text block extraction result 302, instead of using inappropriate text blocks 313, 314, and 316. The text block consolidator 123 also avoids the use of inappropriate text blocks 329, 330, and 331 in the second text block extraction result 302, and instead, it selects text blocks 317 and 318 from the first text block extraction result 301. The resulting set of text blocks as a whole is suitable for character recognition.

As can be seen from the above description, the present embodiment makes it possible to extract appropriate text blocks from a given document image by consolidating multiple sets of text blocks extracted with different conditions. Appropriate text block definitions will contribute to an improved accuracy in the subsequent character recognition process.

According to the experiment we conducted, the document layout analyzer of the present embodiment demonstrated its enhanced performance contributing to a better text recognition accuracy. For this experiment, forty sample documents with complicated text layout were collected from various sources including news papers, magazines, print advertisements, and the like. Using those sample documents, we compared the character recognition results obtained with two different setups: (1) extracting text blocks through a single execution of a recursive text block extraction process; and (2) executing a recursive text block extraction process five times with different initial parameters and consolidating the extracted text blocks. The latter setup (2) exhibited an improvement in recognition accuracy from 96.3% to 98.0%.

SECOND EMBODIMENT

This section will describe a second embodiment of the present invention, in which the text block consolidator executes its consolidation tasks as each new set of text blocks are extracted from a document image, rather than consolidating all text block extraction results at once as in the first embodiment. This approach of the second embodiment is referred to herein as a sequential method.

The second embodiment of the invention employs the same function elements as those discussed in the first embodiment in FIG. 3, although it analyzes document layout in a different way. The following section will therefore use the elements and reference numerals shown in FIG. 3 to explain the second embodiment.

According to the second embodiment, the text block extractor 122 outputs the results of text block extraction in the order of $R_0, R_1, \ldots R_{p\_num-1}$. The text block consolidator 123 receives them sequentially in that order, while incorporating new text blocks into the current set of text blocks where appropriate. More specifically, when the parameter set identifier i is greater than zero, the text block consolidator 123 consolidates a text block extraction result $R_i$ newly obtained by using a parameter set P(i) into the current extraction result $R_{i-1}$ that includes consolidated text blocks corresponding to parameter sets P(0) to P(i-1). The text block consolidator 123 then substitutes the resulting set of text blocks for $R_i$.

Figure 28:
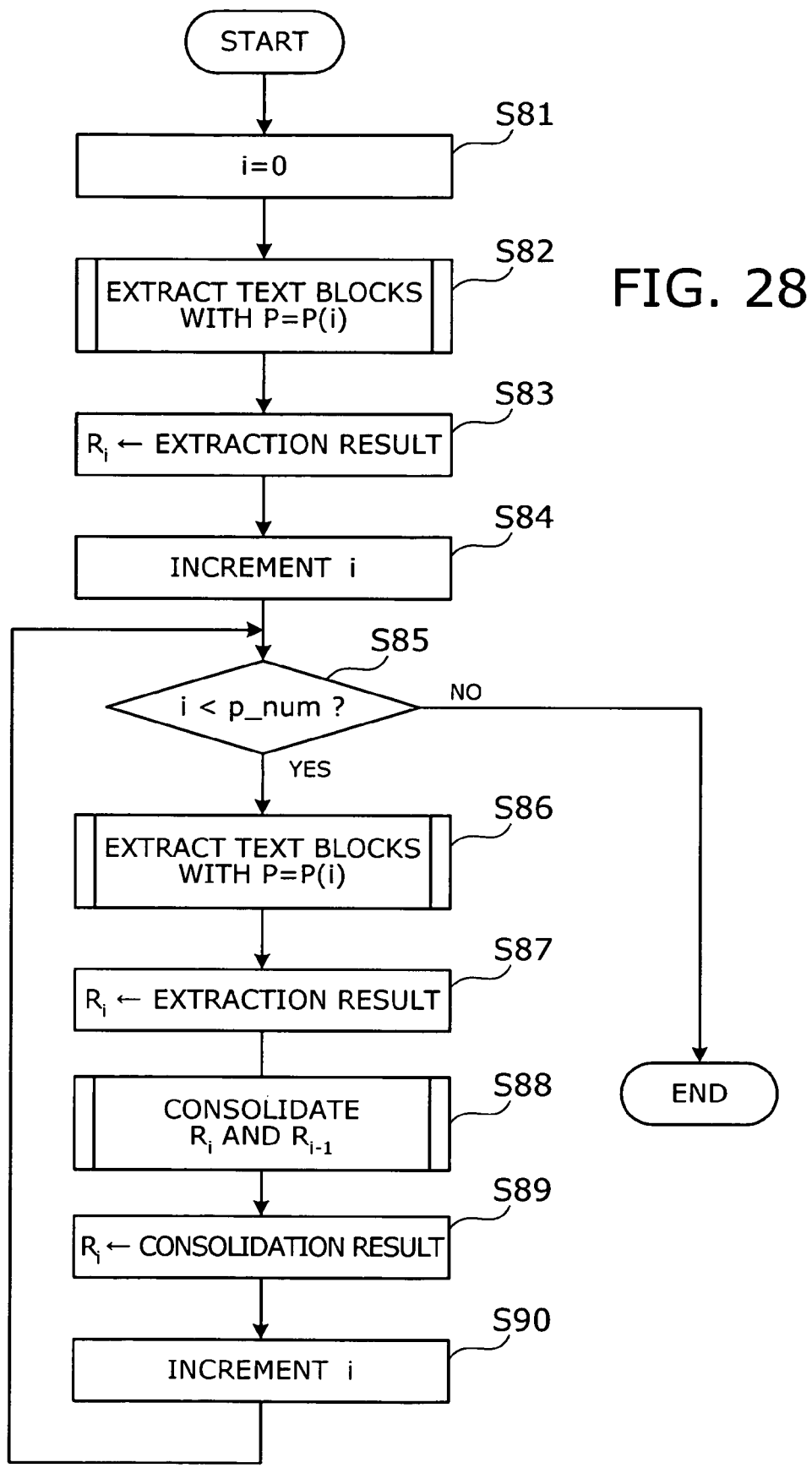
FIG. 28 is a flowchart of a document layout analysis according to a second embodiment of the present invention.

FIG. 28 is a flowchart of a document layout analysis according to the second embodiment of the present invention. This process includes the following steps:

(Step S81) The text block extractor 122 initializes i to zero, where i is an index number for specifying a particular parameter set.

(Step S82) With P=P(i), the text block extractor 122 extracts text blocks from a given document image. The detailed procedure of this step is the same as the text block extraction process of FIG. 6 described in the first embodiment.

(Step S83) The text block extractor 122 saves the text block extraction result of step S82 as $R_i$.

(Step S84) The text block extractor 122 increments i by one.

(Step S85) The text block extractor 122 determines whether i is smaller than p_num. If i<p_num, the process advances to step S86. If not, the process is terminated.

(Step S86) With P=P(i), the text block extractor 122 extracts text blocks from the document image. The detailed procedure of this step is the same as the text block extraction process of FIG. 6 described in the first embodiment.

(Step S87) The text block extractor 122 assigns the text block extraction result of step S86 to Ri.

(Step S88) The text block consolidator 123 consolidates the text block extraction results $R_i$ and $R_{i-1}$. The detailed procedure of this step is the same as the text block consolidation process of FIG. 14 discussed in the first embodiment.

(Step S89) The text block extractor 122 substitutes the outcome of step S88 for $R_i$.

(Step S90) The text block extractor 122 increments i by one before making the process go back to step S85.

The above processing steps produces multiple sets of extracted text blocks while varying parameter sets until i reaches p_num. Each time a new set is produced, the extracted text blocks are subjected to consolidation with the preceding text blocks. In other words, multiple sets of text blocks are sequentially consolidated into a single set. This sequential method according to the second embodiment reduces the memory consumption for storing extracted text blocks as source data for the consolidation operation.

The text block consolidation process may be modified such that the consolidated set $R_i$ will be evaluated in terms of cognitive cost and linguistic cost each time it is updated with new text blocks, and the analysis will be terminated if the evaluation result falls below a predetermined value (or exceeds a predetermined value in the case the costs are normalized). That is, once the quality of consolidated text blocks reaches a required level, no further text block extraction or consolidation will happen. Advantageously, this method reduces the analysis time.

Other Variations

In order to produce multiple sets of extracted text blocks, both the first and second embodiments change the initial parameters for use in separator detection. The present invention, however, should not be limited to that particular method, but may also use quite different techniques to obtain a plurality of extraction results for consolidation. For example, Japanese Patent Application Publication Nos. 11-219407 (1999) and 2-263272 (1990) disclose alternative approaches for extracting text blocks. A combined use of different extraction techniques will produce a more accurate result of text block consolidation.

Computer-readable Media

The above-described processing mechanisms of the proposed document layout analyzer 120 are actually implemented on a computer system, the instructions being encoded and provided in the form of computer programs. A computer system executes those programs to provide the intended functions of the present invention. For the purpose of storage and distribution, the programs are stored in a computer-readable storage medium. Suitable computer-readable storage media include magnetic storage media, optical discs, magneto-optical storage media, and solid state memory devices. Magnetic storage media include hard disk drives (HDD), flexible disks (FD), and magnetic tapes. Optical discs include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for distribution of program products. Network-based distribution of software programs is also possible, in which case some master program files are made available in a server computer for downloading to other computers via a network. A user computer stores necessary programs in its local storage unit, which have previously been installed from a portable storage media or downloaded from the server computer. The computer executes the programs read out of the local storage unit, thereby performing the programmed functions. As an alternative way of program execution, the computer may execute programs, reading out program codes directly from a portable storage medium. Another alternative method is such that a user computer dynamically downloads programs from a server computer on a demand basis and executes them upon delivery.

Conclusion

The proposed computer program, apparatus and method are designed to extract multiple sets of text blocks on the basis of different extraction conditions and consolidate them into a single set of text blocks that are deemed to have a higher validity. This feature of the present invention enables an appropriate set of text blocks to be extracted even in the case where the document layout is so complicated that conventional extraction methods with a single extraction condition would not work well.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a program for analyzing layout of text on a document image to extract text blocks for character recognition purposes, the program causing a computer to function as:
   an extraction condition memory storing a plurality of extraction conditions for use in extracting text blocks from a given document image;
   a text block extractor to extract a first set of non-overlapping text blocks from the given document image in accordance with one of the extraction conditions stored in said extraction condition memory, the text block extractor to also extract a second set of non-overlapping text blocks from the same document image in a different way from the first set, in accordance with another of the extraction conditions; and
   a text block consolidator to produce a consolidated set of text blocks by performing character recognition on each text block extracted by said text block extractor, evaluating validity of each text block based on a result of the character recognition, creating a consolidation source set by finding a text block of the first set which overlaps with a text block of the second set, adding both of those text blocks to the consolidation source set, and repeating operations of finding a text block of the first and second sets which overlaps with any of the text blocks belonging to the consolidated set and adding the found text block to the consolidation source set, and selecting a most valid combination of non-overlapping text blocks from among the text blocks belonging to the consolidation source set, based on the validity of each text block that has been evaluated.

2. The computer-readable medium according to claim 1, wherein said text block consolidator finds a text block more valid if the character recognition performed on that text block exhibits a higher recognition accuracy.

3. The computer-readable medium according to claim 1, wherein said text block consolidator finds a text block more valid if the character recognition performed on that text block has produced text that sounds more natural from linguistic perspectives.

4. The computer-readable medium according to claim 1, wherein said text block consolidator forms a plurality of combinations of non-overlapping text blocks from among the test blocks belonging to the consolidation source set, then evaluates the validity of each of the combinations, based on the result of the character recognition, and then selects text blocks belonging to one of the combinations that exhibits highest validity among others.

5. The computer-readable medium according to claim 4, wherein said text block consolidator evaluates the validity of each combination in terms of a normalized sum of recognition accuracy and linguistic naturalness, the recognition accuracy representing accuracy of the result of the character recognition, and the linguistic naturalness representing naturalness of the result of the character recognition from linguistic perspectives.

6. The computer-readable medium according to claim 4, wherein:
   the validity of each of the combinations is represented in numerical form;
   said text block consolidator compares the validity numbers of every two combinations and gives a point to a superior combination whose validity number exceeds the other combination's validity number by a predetermined difference; and
   said text block consolidator selects text blocks belonging to one of the combinations that has earned a highest total point.

7. The computer-readable medium according to claim 1, wherein:
   separators are defined as blank areas on the given document image that separate one text block from another; and
   the extraction conditions stored in said extraction condition memory include a minimum size of the separators.

8. A document layout analyzing apparatus for analyzing layout of text on a document image to extract text blocks for character recognition purposes, the apparatus comprising:
   an extraction condition memory to store a plurality of extraction conditions for use in extracting text blocks from a given document image;
   a text block extractor to extract a first set of non-overlapping text blocks from the given document image in accordance with one of the extraction conditions stored in said extraction condition memory, as well as extracting a second set of non-overlapping text blocks from the same document image in a different way from the first set, in accordance with another of the extraction conditions; and a text block consolidator to produce a consolidated set of text blocks by performing character recognition on each text block extracted by said text block extractor, evaluating validity of each text block based on a result of the character recognition, creating a consolidation source set by finding a text block of the first set which overlaps with a text block of the second set, adding both of those text blocks to the consolidation source set, and repeating operations of finding a text block of the first and second sets which overlaps with any of the text blocks belonging to the consolidated set and adding the found text block to the consolidation source set, and selecting a most valid combination of non-overlapping text blocks from among the text blocks belonging to the consolidation source set, based on the validity of each text block that has been evaluated.

9. The document layout analyzing apparatus according to claim 8, wherein said text block consolidator finds a text block more valid if the character recognition performed on that text block exhibits a higher recognition accuracy.

10. The document layout analyzing apparatus according to claim 8, wherein said text block consolidator finds a text block more valid if the character recognition performed on that text block has produced text that sounds more natural from linguistic perspectives.

11. The document layout analyzing apparatus according to claim 8, wherein said text block consolidator forms a plurality of combinations of non-overlapping text blocks from among the test blocks belonging to the consolidation source set, then evaluates the validity of each of the combinations, based on the result of the character recognition, and then selects text blocks belonging to one of the combinations that exhibits highest validity among others.

12. The document layout analyzing apparatus according to claim 8, wherein:

separators are defined as blank areas on the given document image that separate one text block from another; and the extraction conditions stored in said extraction condition memory include a minimum size of the separators.

13. A document layout analyzing method for analyzing layout of text on a document image to extract text blocks for character recognition purposes, comprising:

storing a plurality of extraction conditions;

extracting a first set of non-overlapping text blocks from the document image in accordance with one of the stored extraction conditions;

extracting a second set of non-overlapping text blocks from the same document image in a different way from the first set, in accordance with another of the extraction conditions;

performing character recognition on each extracted text block of the first and second sets;

evaluating validity of each text block of the first and second sets, based on a result of the character recognition;

creating a consolidation source set by finding a text block of the first set which overlaps with a text block of the second set, adding both of those text blocks to the consolidation source set, and repeating operations of finding a text block of the first and second sets which overlaps with any of the text blocks belonging to the consolidated set and adding the found text block to the consolidation source set; and producing a consolidated set of text blocks by selecting a most valid combination of non-overlapping text blocks from among the text blocks belonging to the consolidation source set, based on the validity of each text block that has been evaluated.

14. The document layout analyzing method according to claim 13, wherein said evaluating finds a text block more valid if the character recognition performed on that text block exhibits a higher recognition accuracy.

15. The document layout analyzing method according to claim 13, wherein said evaluating finds a text block more valid if the character recognition performed on that text block has produced text that sounds more natural from linguistic perspectives.

16. The document layout analyzing method according to claim 13, wherein said producing comprises:

forming a plurality of combinations of non-overlapping text blocks from among the text blocks belonging to the consolidation source set and then evaluates the validity of each of the combinations, based on the result of the character recognition; and selecting text blocks belonging to one of the combinations that exhibits highest validity among others.

17. The document layout analyzing method according to claim 13, wherein:

separators are defined as blank areas on the given document image that separate one text block from another; and the extraction conditions include a minimum size of the separators.

* * * * *